(12) United States Patent  
Scurrell et al.

(10) Patent No.: US 10,742,733 B2  
(45) Date of Patent: Aug. 11, 2020

(54) SYNCHRONIZING DATA BETWEEN MEDIA DEVICES

(71) Applicant: TIMECODE SYSTEMS LIMITED, Worcester (GB)

(72) Inventors: Paul Scurrell, Worcester (GB); Matthew Grant, Worcestershire (GB); Simon Jenkins, Bristol (GB)

(73) Assignee: TIMECODE SYSTEMS LIMITED, Worcester (GB)

( * ) Notice: Subject to any disclaimer, the term of this patent is extended or adjusted under 35 U.S.C. 154(b) by 161 days.

(21) Appl. No.: 16/149,466

(22) Filed: Oct. 2, 2018

(65) Prior Publication Data

US 2019/0037018 A1 Jan. 31, 2019

Related U.S. Application Data

(63) Continuation-in-part of application No. 16/103,482, filed on Aug. 14, 2018, which is a continuation of (Continued)

(51) Int. Cl.
 *H04N 7/18* (2006.01)
 *H04L 29/08* (2006.01)
 *H04W 4/80* (2018.01)

(52) U.S. Cl.
 CPC .......... *H04L 67/1095* (2013.01); *H04L 67/02* (2013.01); *H04L 67/10* (2013.01);
 (Continued)

(58) Field of Classification Search
 CPC ............. H04N 21/8547; H04N 21/235; H04N 21/242; H04N 21/2743; H04N 21/4223; H04N 21/4302
 See application file for complete search history.

(56) References Cited

U.S. PATENT DOCUMENTS 5,557,423 A 9/1996 Phillips et al.
5,892,552 A 4/1999 Kim
(Continued)

FOREIGN PATENT DOCUMENTS

EP 2 161 921 A1 3/2010
JP 2007-081686 A 3/2007
WO 02/01775 A1 1/2002

OTHER PUBLICATIONS

"An ultra compact timecode, genlock and word clock generator with transceiver," Timecode Systems minitrx+ quick start guide. Retrieved from the Internet: URL:http://www.timecodesystems.com/wp-content/uploads/2015/09/Timecode-Buddy-TRX-Plus-Quickstart-guide-web.pdf.

(Continued)

*Primary Examiner* — Jason Salce
(74) *Attorney, Agent, or Firm* — Brown Rudnick LLP

(57) ABSTRACT

The present invention is directed to systems and methods for acquiring media of the same event from multiple devices. The systems and methods enable wireless communication, specifically over a Bluetooth Low Energy (BLE) wireless personal area network, between multiple media devices, such as personal or consumer devices (i.e., consumer smartphones, tablets, wearable devices, including action cameras, or other computing devices capable to capturing media content in the form of image, video, or audio data) at an event. The systems and methods further enable synchronization, via a specialized timing protocol, between the multiple media devices, over the BLE network, including synchronization of the media content captured by each of the media devices at the event. The present invention further includes an accessory device configured to provide for expansion of communication and synchronization of media (Continued)

devices, specifically bridging a short range BLE network with a long range RF network.

19 Claims, 22 Drawing Sheets

Related U.S. Application Data application No. 15/290,698, filed on Oct. 11, 2016, now Pat. No. 10,063,637, which is a continuation-in-part of application No. 15/290,125, filed on Oct. 11, 2016, now Pat. No. 10,021,465.

(60) Provisional application No. 62/323,139, filed on Apr. 15, 2016, provisional application No. 62/307,820, filed on Mar. 14, 2016, provisional application No. 62/240,352, filed on Oct. 12, 2015.

(52) U.S. Cl.
CPC ............... *H04L 67/12* (2013.01); *H04W 4/80* (2018.02); *H04L 67/04* (2013.01); *H04L 67/1097* (2013.01)

(56) References Cited

U.S. PATENT DOCUMENTS

| | | | |
|---|---|---|---|
| 6,831,729 B1 | 12/2004 | Davies | |
| 7,024,155 B2 | 4/2006 | Gosieski, Jr. | |
| 7,200,320 B1 | 4/2007 | Denecke et al. | |
| 7,321,601 B2 | 1/2008 | Rogerson et al. | |
| 7,324,743 B2 | 1/2008 | Hosoda | |
| 7,398,411 B2 | 7/2008 | Zweigle et al. | |
| 7,436,899 B2 | 10/2008 | Rogerson et al. | |
| 7,552,193 B2 | 6/2009 | Carro | |
| 7,555,196 B1 | 6/2009 | Crawford et al. | |
| 7,593,619 B2 | 9/2009 | Yamasaki | |
| 7,609,608 B2 | 10/2009 | Rogerson et al. | |
| 7,633,551 B2 | 12/2009 | Sullivan | |
| 7,673,316 B2 | 3/2010 | Incentis Carro | |
| 7,711,443 B1 | 5/2010 | Sanders et al. | |
| 7,743,161 B2 | 6/2010 | Dey et al. | |
| 7,881,587 B2 | 2/2011 | Shinkai et al. | |
| 7,913,157 B1 | 3/2011 | Stoakley et al. | |
| 7,929,902 B1 | 4/2011 | Sanders et al. | |
| 7,933,203 B2 | 4/2011 | Hahm | |
| 8,019,194 B2 | 9/2011 | Morrison et al. | |
| 8,643,779 B2 | 2/2014 | Suess et al. | |
| 8,806,544 B1 | 8/2014 | Elliott et al. | |
| 9,041,813 B1 | 5/2015 | Yakay et al. | |
| 9,049,349 B2 | 6/2015 | Ganesan et al. | |
| 2001/0044826 A1 | 11/2001 | Ludwig et al. | |
| 2002/0034255 A1 | 3/2002 | Zetts | |
| 2002/0091495 A1 | 7/2002 | Woodroffe | |
| 2002/0131511 A1 | 9/2002 | Zenoni | |
| 2003/0193577 A1 | 10/2003 | Doring et al. | |
| 2005/0240531 A1 | 10/2005 | Wolff | |
| 2006/0035663 A1 | 2/2006 | Cheng | |
| 2006/0053455 A1 | 3/2006 | Mani et al. | |
| 2007/0189333 A1* | 8/2007 | Naaman | G06F 1/14 370/477 |
| 2007/0216691 A1 | 9/2007 | Dobrin | |
| 2007/0250901 A1 | 10/2007 | McIntire et al. | |
| 2009/0009605 A1* | 1/2009 | Ortiz | H04N 21/4314 348/157 |
| 2010/0122168 A1 | 5/2010 | Silberstein et al. | |
| 2010/0158473 A1 | 6/2010 | Wayne et al. | |
| 2010/0195978 A1 | 8/2010 | Ekchian et al. | |
| 2010/0277611 A1* | 11/2010 | Holt | H04N 21/84 348/231.2 |
| 2011/0052137 A1 | 3/2011 | Cowie | |
| 2011/0149093 A1 | 6/2011 | Kang et al. | |
| 2011/0179196 A1 | 7/2011 | Friedman | |
| 2011/0249128 A1 | 10/2011 | Squyres et al. | |
| 2011/0296474 A1 | 12/2011 | Babic | |
| 2012/0050591 A1 | 3/2012 | Horikawa | |
| 2012/0069943 A1 | 3/2012 | Lim et al. | |
| 2012/0236201 A1 | 9/2012 | Larsen et al. | |
| 2012/0249831 A1 | 10/2012 | Porter | |
| 2013/0114481 A1 | 5/2013 | Kim et al. | |
| 2013/0301635 A1 | 11/2013 | Hollabaugh et al. | |
| 2013/0307971 A1 | 11/2013 | Ganesan et al. | |
| 2013/0330055 A1 | 12/2013 | Zimmermann et al. | |
| 2014/0075465 A1 | 3/2014 | Petrovic et al. | |
| 2014/0085136 A1 | 3/2014 | Alpert et al. | |
| 2014/0307805 A1 | 10/2014 | Ihara | |
| 2014/0355947 A1* | 12/2014 | Slamecka | H04N 5/91 386/201 |
| 2015/0015680 A1* | 1/2015 | Wang | G11B 27/30 348/51 |
| 2015/0029396 A1 | 1/2015 | Scurrell | |
| 2015/0043697 A1 | 2/2015 | Achanta et al. | |
| 2015/0098690 A1 | 4/2015 | Abbate et al. | |
| 2015/0271546 A1 | 9/2015 | Kim | |
| 2016/0005439 A1 | 1/2016 | Stark et al. | |
| 2016/0218820 A1 | 7/2016 | Scurrell et al. | |
| 2017/0053674 A1 | 2/2017 | Fisher et al. | |
| 2017/0085518 A1 | 3/2017 | Lord | |
| 2017/0104821 A1 | 4/2017 | Scurrell | |
| 2017/0104896 A1 | 4/2017 | Scurrell | |
| 2017/0105054 A1 | 4/2017 | Bannister et al. | |

OTHER PUBLICATIONS

"Clockit Timecode ACL 204 Lockit" Rev. 1.00 manual by Ambient Recording GmbH, 24 pages, copyright 2012.

"Clockit Timecode ACL 204 Lockit" Rev. 3.11 manual by Ambient Recording GmbH, 32 pages, copyright 2013.

"Digital cellular telecommunications system (Phase 2); Radio subsystem synchronization (GSM 05.10)," European Telecommunication Standard (ETS) 300 579, vol. SMG2, Sixth Edition, Nov. 1, 1996 (Nov. 1, 1996), XP014013776.

"The Trilevelsync Lockit Box ACL 203" manual by Ambient Recording GmbH, 9 pages, from about 2012 or earlier.

Extended Search Report dated Feb. 7, 2017 in EP Application No. 16193386.6.

Extended Search Report dated Feb. 7, 2017 in EP Application No. 16193387.4.

F. Beacham, "Precision Time Code and Genlock Bring Wireless Action Cameras Into Live Broadcasting—The Broadcast Bridge Connecting IT to Broadcast," Jun. 23, 2015. Retrieved from the Internet: URL:https://www.thebroadcastbridge.com/content/entry/2879/precision-time-code-and-genlock-bring-wireless-action-cameras-into-live-bro.

Final Office Action dated Jun. 2, 2017 in U.S. Appl. No. 13/948,252.

Final Office Action dated May 2, 2016 in U.S. Appl. No. 13/948,252.

Final Office Action dated Dec. 14, 2017 for U.S. Appl. No. 13/948,252.

Non-Final Office Action dated Aug. 17, 2017 in U.S. Appl. No. 13/948,252.

Non-Final Office Action dated Aug. 24, 2017 in U.S. Appl. No. 15/005,599.

Non-Final Office Action dated Aug. 3, 2017 in U.S. Appl. No. 15/290,709.

Non-Final Office Action dated Dec. 11, 2017 in U.S. Appl. No. 15/290,125.

Non-Final Office Action dated Jul. 21, 2017 in U.S. Appl. No. 13/948,252.

Non-Final Office Action dated Jul. 24, 2017 in U.S. Appl. No. 15/290,709.

Non-Final Office Action dated Oct. 5, 2015 in U.S. Appl. No. 13/948,252.

Non-Final Office Action dated Sep. 23, 2016 in U.S. Appl. No. 13/948,252.

Non-Final Office Action dated Mar. 16, 2018 for U.S. Appl. No. 15/290,698 (11 Pages).

Notice of Allowance dated Nov. 27, 2017 in U.S. Appl. No. 15/005,599 (10 pages).

(56) References Cited

OTHER PUBLICATIONS

Notice of Allowance dated Oct. 12, 2017 in U.S. Appl. No. 15/290,709 (18 pages).
Notice of Allowance dated May 11, 2018 for U.S. Appl. No. 15/290,125 (8 Pages).
Partial Search Report dated Feb. 7, 2017 in EP Application No. 16193388.2.
Response to OA dated Oct. 5, 2015, filed Jan. 4, 2016 in U.S. Appl. No. 13/948,252.
Response to OA dated May 2, 2016, filed Aug. 1, 2016 U.S. Appl. No. 13/948,252.
Response to OA dated Jun. 2, 2017, filed Jun. 20, 2017 in U.S. Appl. No. 13/948,252.
Response to OA dated Jul. 24, 2017, filed Jul. 25, 2017 in U.S. Appl. No. 15/290,709.
Response to OA dated Aug. 17, 2017, filed Aug. 25, 2017 in U.S. Appl. No. 13/948,252.
Response to OA dated Aug. 3, 2017, filed Aug. 21, 2017 in U.S. Appl. No. 15/290,709.
Response to OA dated Sep. 23, 2016, filed Mar. 17, 2017 in U.S. Appl. No. 13/948,252.
Response to Office Action of Aug. 24, 2017, filed Aug. 31, 2017 in U.S. Appl. No. 15/005,599.
Supplemental Response to OA, filed Aug. 22, 2017 in U.S. Appl. No. 15/290,709.
Notice of Allowance dated Jul. 19, 2018 for U.S. Appl. No. 15/290,698 (9 Pages).
"Timecode Systems Reveals UltraSync BLUE: A New Timecode-Over-Bluetooth Solution," Timecode Systems Press Release Sep. 28, 2018, (6 pages).
"UltraSync BLUE, Timecode over Bluetooth," Retrieved from the Internet: URL:https://www.timecodesystems.com/products-home/ultrasyncblue/ (4 pages).
European Office Action issued in EP 16193387.4, dated Jun. 4, 2018, 5 pages.
Summons to Attend Oral Proceedings dated Aug. 8, 2019 in EP Application No. 16193387.4, 6 pages.
International Search Report and Written Opinion dated Jan. 7, 2020 for International Application No. PCT/IB2019/001053.
Dian, F. John et al.: (2017). A study in accuracy of time synchronization of BLE devices using connection-based event. 595-601. 10.1109/IEMCON.2017.8117156.
Sabarish Sridhar et al: CheepSync: "A Time Synchronization Service for Resource Constrained Bluetooth Low Energy Advertisers", Arxiv.org, Cornell University Library, Jan. 26, 2015.
Non-Final Office Action dated Feb. 13, 2020 in U.S. Appl. No. 16/103,482 (13 pages).

* cited by examiner

SYNCHRONIZING DATA BETWEEN MEDIA DEVICES

CROSS-REFERENCE TO RELATED APPLICATIONS

This application is a continuation-in-part of U.S. application Ser. No. 16/103,482, filed on Aug. 14, 2018, which is a continuation of U.S. application Ser. No. 15/290,698, filed on Oct. 11, 2016 (now U.S. Pat. No. 10,063,637), which is a continuation-in-part of U.S. application Ser. No. 15/290,125, filed on Oct. 11, 2016 (now U.S. Pat. No. 10,021,465). U.S. application Ser. No. 15/290,698 also claims the benefit of, and priority to, U.S. Provisional Application No. 62/240,352, filed on Oct. 12, 2015, U.S. Provisional Application No. 62/307,820, filed on Mar. 14, 2016, and U.S. Provisional Application No. 62/323,139, filed on Apr. 15, 2016. The entire teachings of the above applications are incorporated by reference herein in their entirety.

FIELD

The present disclosure relates generally to data synchronization, and, more particularly, to systems and methods for wirelessly synchronizing data between media devices.

BACKGROUND

Modern audio and video processing systems typically use multiple cameras for simultaneous audio and video recording of their subjects. For the multiple recordings to be effectively employed in post-production, where all of the raw recording materials are edited into a final recording, the audio and video signals from all utilized cameras must be carefully synchronized.

In a media synchronization system, acquiring media from multiple devices can improve the quality of the final media product. Conventionally, professional media production has been limited to information captured by professional equipment connected to synchronization equipment. This information is often inaccessible or difficult to access by the general public. As consumer media devices become more commonplace, consumers are routinely recording and photographing events. In many cases, consumers are also publishing and sharing these recordings and photographs with the public via social media platforms. While consumer media devices continue to develop, these devices are inherently limited to a single view from a particular location. Furthermore, these consumer media devices likely capture media with a lower quality than a professional setup.

Many media applications capture information using multiple devices. However, these multi-camera or multi-device configurations inherently pose significant data processing problems. That is, the devices must be synchronized together so that each media clip is embedded with timecode data and metadata that determines camera acquisition settings. Additional metadata can also be added at acquisition. Timecode information is used to identify a location in digital systems and on time-based media (e.g., audio or video tape) and is relied on for synchronization and reference throughout the audio, video, and post-production process. The Society of Motion Picture and Television Engineers ("SMPTE") genlock (Tri-level and Bi-Level sync signals) is an industry standard signal waveform that is relied on for synchronization and reference throughout the audio, video, and post-production process. Similarly, the audio and video signals from one camera at a given point in time may not properly align with the audio and video signals from a second camera. Without synchronization, the audio signals from one audio recorder at a given point in time may not properly align with the audio and video signals from a second camera.

In other words, if the devices are not synced, then each recorded clip of media will require manual synchronizing during post-production processing. This processing is both time consuming and expensive. During live events, streaming media feeds pose an even greater problem because there is no or a limited opportunity for post-production processing. Devices used for broadcasting live productions need to be synchronized together when the media is being recorded (e.g., in real-time). Therefore, ensuring that the devices are genlocked so that the cameras are in phase or synchronized with each other is important.

SUMMARY

Bluetooth connectivity is becoming an increasingly common feature of audio and video devices. However, in the context of media synchronization systems, the transfer of timing data over a Bluetooth network, specifically over Bluetooth Low Energy (BLE) networks, faces challenges. In particular, BLE data packets generally occur at the boundaries of "connection periods", wherein such "connection periods" are negotiated at connection time, and thus such BLE data packets are not known by a server handling the transmission of the data packets between media devices and other timecoding devices (i.e., base stations, accessories, etc.) until a connection is made. As these "connection periods" are not related to either seconds or frames, at either end of the connection, it is necessary to allow for this within the transfer protocol.

This disclosure generally describes systems and methods enabling communication between multiple media devices at an event. In particular, the systems and methods enable wireless communication, specifically over a Bluetooth Low Energy (BLE) wireless personal area network, between multiple media devices, such as personal or consumer devices (i.e., consumer smartphones, tablets, wearable devices, including action cameras, or other computing devices capable to capturing media content in the form of image, video, or audio data). The systems and methods further enable synchronization, via a specialized timing protocol, between the multiple media devices, over the BLE network, including synchronization of the media content captured by each of the media devices at the event. The media content, which includes timecode, synchronization, and/or metadata information, can be stored in a database, such as a cloud-based server, thereby allowing for users to upload and share their captured media content. Because the media content is already associated with timecode, synchronization, and/or metadata information, there is no need for an individual user to guess or to manually synchronize footage when merging data from the multiple devices. This pre-synchronization helps users incorporate media from multiple sources while editing footage. Simply put, media recorded by a personal consumer device is prepared for seamless integration with video or audio recorded other consumer devices because the devices are synchronized.

The systems and methods of the present disclosure address the inherent drawback of BLE communication previously described. In particular, rather than relying on any additional hardware or adapters to address the BLE communication issues, such as implementing a low-level hardware time-stamping at both ends of a connection, the specialized timing protocol of the present disclosure utilizes the existing hardware of a user's media device to carry out the timecode, synchronization, and/or metadata processes, including the exchange of timecode data over a BLE network. In other words, a user does not need to include any additional hardware attachments on their personal device in order for captured audio and/or video to be synchronized and integrated with audio and/or video captured by other media devices at the same event. The systems and methods of the present disclosure further provide for the expansion of communication and synchronization of media devices across a greater distance than what is generally provided over a Bluetooth network, particularly a BLE network. In particular, the present disclosure provides an accessory device configured to communicate over at least a Bluetooth network and is further configured to communicate over a radiofrequency (RF) network. For example, upon pairing with one or more personal media devices over a Bluetooth network, the accessory device is configured to establish a master/slave setup and device association, in which the accessory device can serve as the master and one or more personal media devices serve as the slave(s), in which timecode data may be transmitted wirelessly from the accessory device directly into a media file of a connected personal media device. In particular, the accessory device comprises a highly accurate temperature compensated crystal oscillator ("TCXO") and timecode generator used as the "master" generator and clocking source. The accessory device master timing signal is accurate and stable, thereby allowing (by way of the specialized timing protocol provided in a BLE SKD) effective communication with the one or more personal media devices. In particular, the accessory device is configured to govern and "pseudo" genlock sync camera module frame rate delivery, allowing all paired personal media devices to capture media content at exactly the same frame rate without any drift over time.

The accessory device is configured to pair and communicate with a plurality of personal media devices, so long as the personal media devices are within the standard range for Bluetooth connectivity. Accordingly, at an event that covers a large distance (i.e., a live concert or sporting event), multiple accessory devices may be provided, wherein each accessory device is paired with a respective set of a plurality of personal media devices. The multiple accessory devices can be spaced distances apart, while still configured sync with one another and exchange metadata on a network dedicated to the accessory devices.

Furthermore, because the accessory device is configured to communicate over an RF network, the accessory device is configured to bridge a long range RF network ((e.g., a BLINK network) (covering hundreds of meters) together with the shorter range Bluetooth network (specifically the BLE network). Accordingly, the accessory device expands the synchronization of personal media devices with professional media devices that normally operate over the RF network, allowing such devices to communicate captured media content across a greater distance. In particular, professional media devices are able to share the same sync network and join the network with other hardware products that can give physical timecode and genlock signals derived from the network (i.e., allowing for the supply of highly accurate timecode, genlock, and wordclock data into professional devices with the same frame rate and timecode as the personal media devices.

BRIEF DESCRIPTION OF THE DRAWINGS

Features and advantages of the claimed subject matter will be apparent from the following detailed description of embodiments consistent therewith, which description should be considered with reference to the accompanying drawings.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

By way of overview, the present disclosure is generally directed to systems and methods for acquiring media of the same event from multiple devices. The systems and methods enable wireless communication, specifically over a Bluetooth Low Energy (BLE) wireless personal area network, between multiple media devices, such as personal or consumer devices (i.e., consumer smartphones, tablets, wearable devices, including action cameras, or other computing devices capable to capturing media content in the form of image, video, or audio data) at an event. The systems and methods further enable synchronization, via a specialized timing protocol, between the multiple media devices, over the BLE network, including synchronization of the media content captured by each of the media devices at the event. The present invention further includes an accessory device configured to provide for expansion of communication and synchronization of media devices, specifically bridging a short range BLE network with a long range RF network.

Accordingly, the present disclosure provides a a scalable system that facilitates synchronization across, for example, a plurality of personal devices, or a plurality of professional devices, or a combination of personal and professional devices. The scalable system includes software, devices, transceivers, controllers, and/or adapters that cooperate to ensure that each camera, sound recording device, and the personal device receives accurate timecode sync data and/or workclock or genlock signals. In some examples, a two-way data exchange is accomplished using the spare bandwidth associated with each timecode frame transmission. The transmitted and received data can be multiplexed from many sources to form one or more networks for data transmission. For example, in some embodiments, the one or more networks may include a wireless network, including, but not limited to, a Bluetooth network (BLE network), a Wi-Fi network, and/or a radiofrequency (RF) network, referred to herein as "BLINK" network. Examples of such sources may include, but are not limited to, devices, modules, transceivers, controllers and/or adapters, described in greater detail herein.

Figure 1:
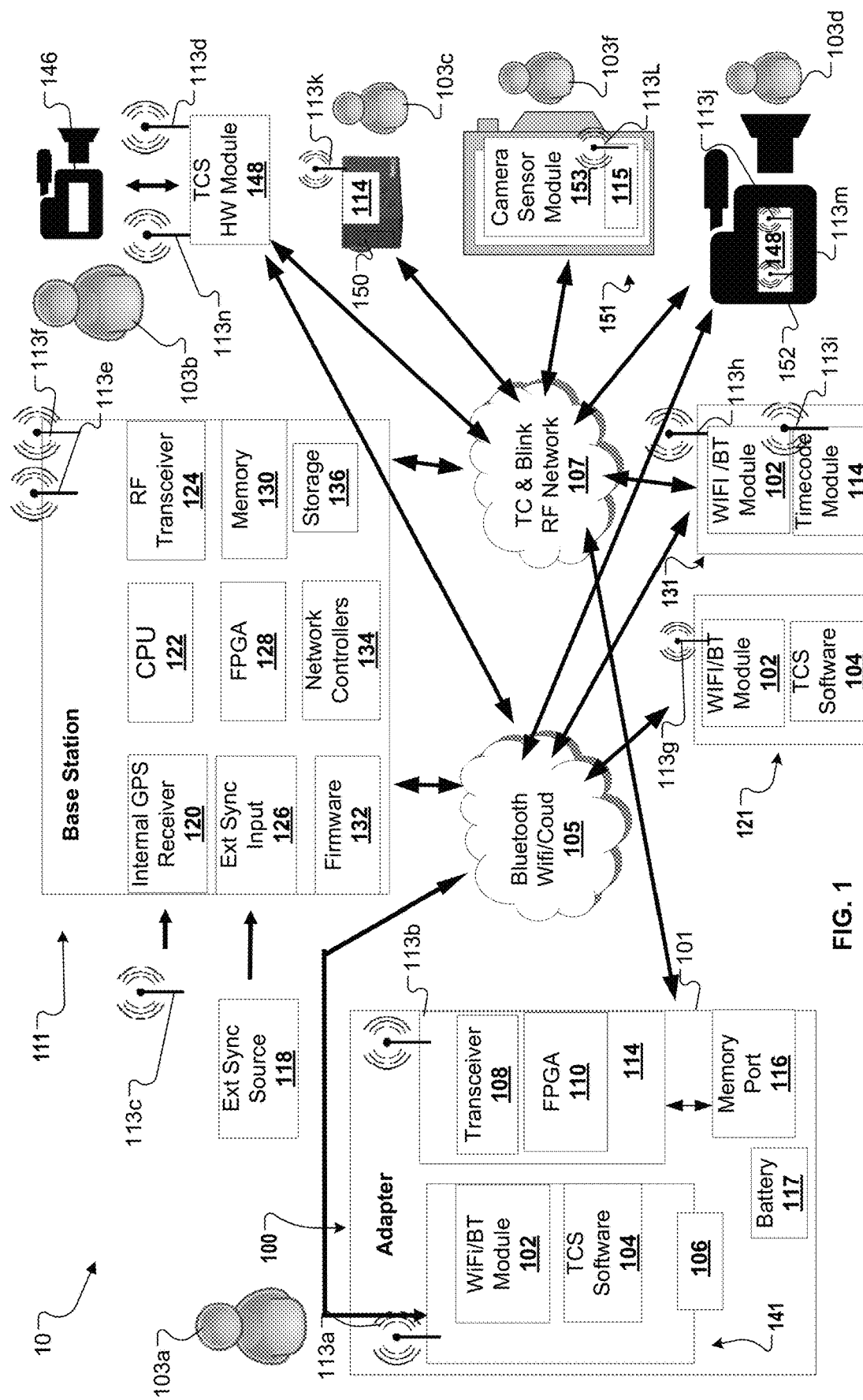
FIG. 1 shows an exemplary network environment in which one embodiment of the disclosure may operate.

Referring to FIG. 1, a system 12 includes a base station 111 and multiple media devices. The media devices include personal devices 141, 121, and 131, professional cameras 146 and 152, and a personal camera 150. Each of the media devices can be used by their respective user 103a-103d. The base station 111 is configured to provide timecode, genlock, metadata or a combination thereof to the media devices over a wireless network 105 (e.g., using Bluetooth or Wi-Fi connection) and/or over a second radio frequency (RF) network (e.g., a BLINK network 107) via the wireless network systems using via one or more antennas 110a-110n. For clarity, the antennas 110a-n will be referred to generally as an antenna 113.

The personal devices 141, 121, and 131 can be a computer, a mobile phone (e.g., a smart phone), a handheld tablet device (e.g., an IPad), or any other mobile network device capable of capturing media and running an application (e.g., a software application 104). As shown in FIG. 1, the personal devices 141, 121, and 131 each includes a communication module 102. The communication module 102 enables the personal device to communicate over Wi-Fi, Bluetooth, or other wireless networks. For example, while the exemplary wireless protocols are described, other protocols that are compatible with a personal device (e.g., a smartphone) can be used. For example, a commercially available smartphone can include 802.11a/b/g/n/ac Wi-Fi; Bluetooth 6.0 wireless technology; Bluetooth 6.2 wireless technology; and NFC, and each of these protocols, alone and in any combination, is compatible with the disclosed methods, devices, and systems.

Figure 2:
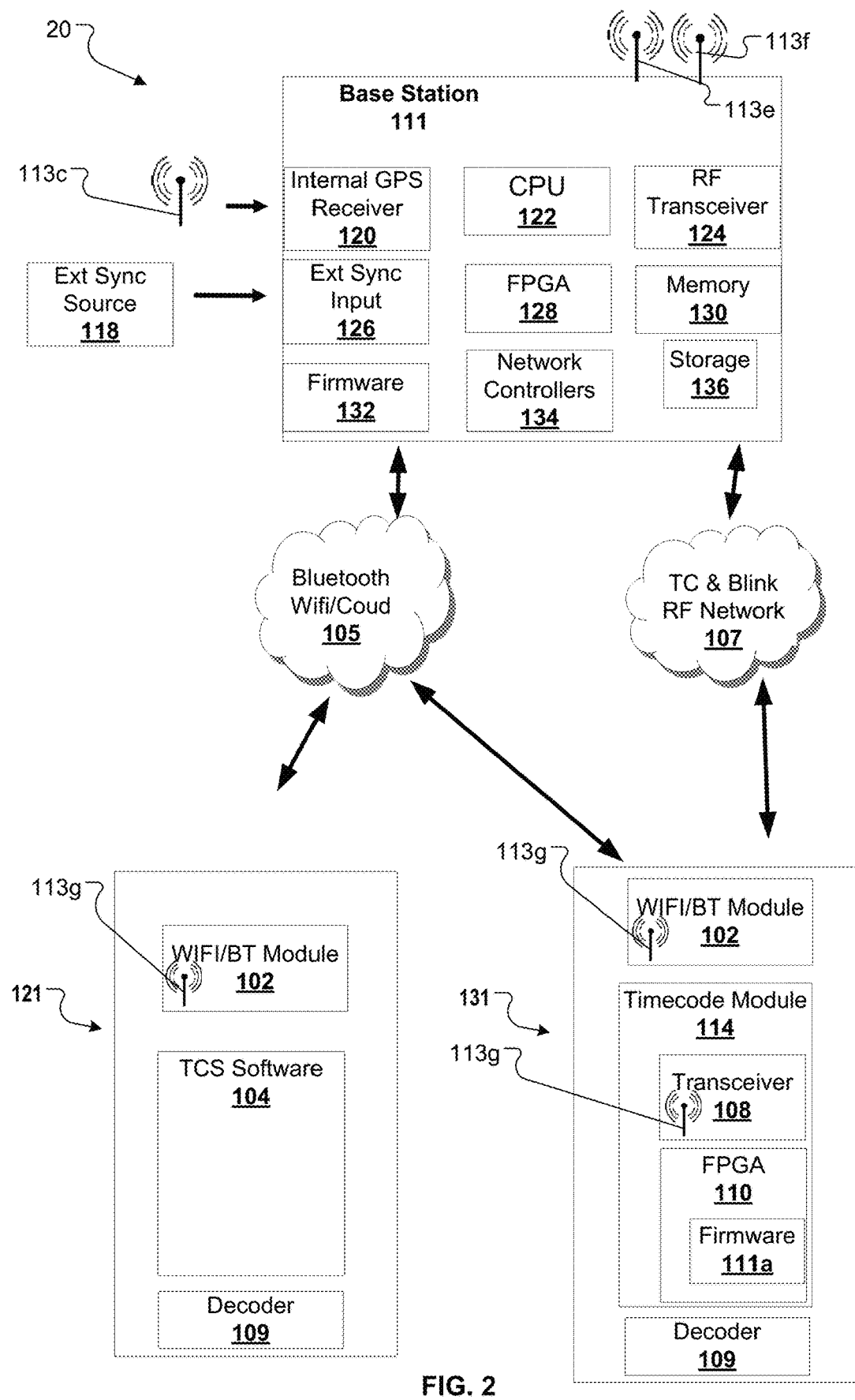
FIG. 2 shows a personal device (e.g., a mobile device) with a software application and a personal device (e.g., a mobile device) with a timecode module in accordance with one embodiment of the present disclosure.
Figure 3:
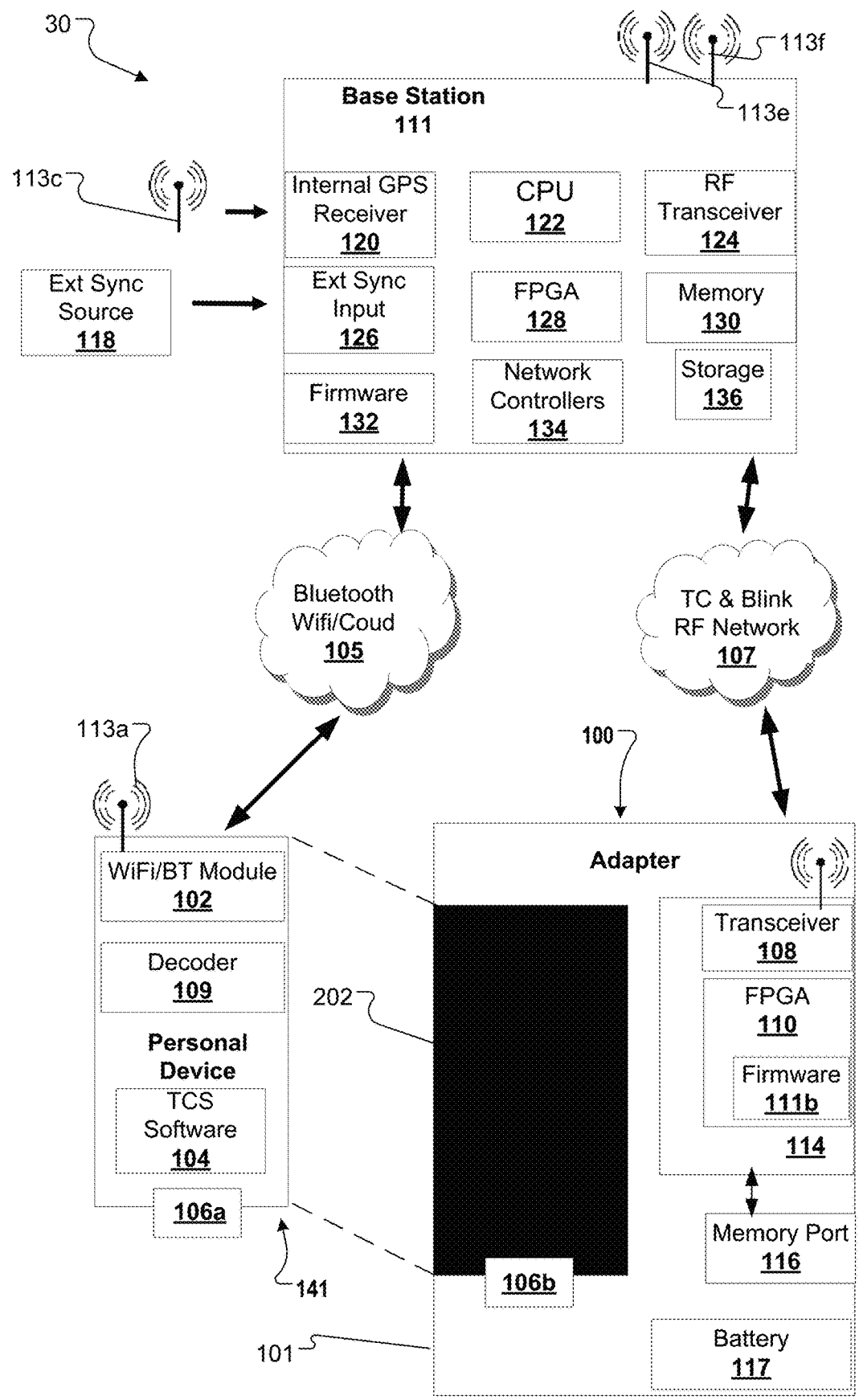
FIG. 3 shows an adapter for a personal device (e.g., a mobile device) for syncing the personal device with a timecode generator in accordance with one embodiment of the present disclosure.
Figure 4:
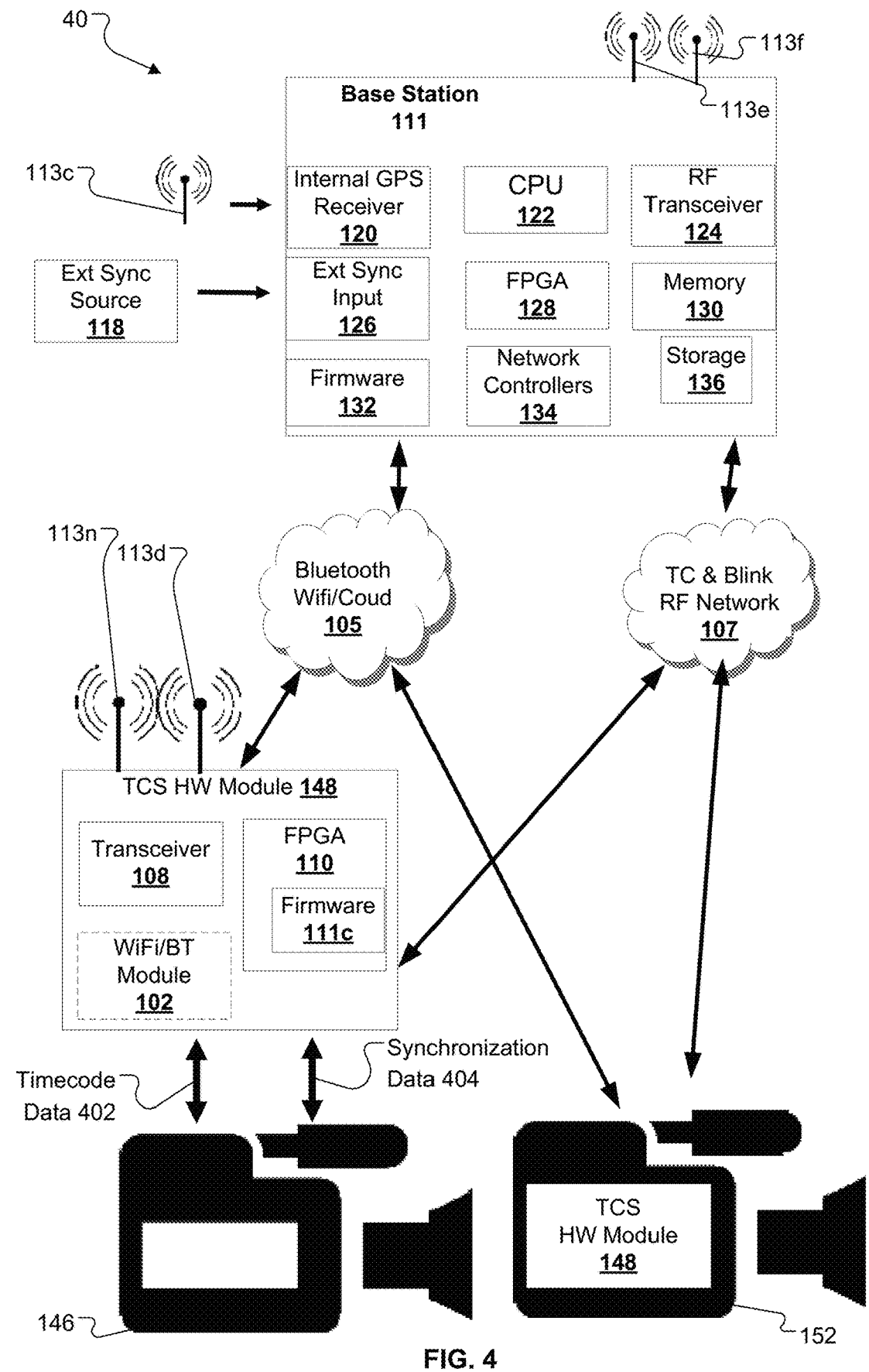
FIG. 4 shows a timecode module connected to a professional camera and a timecode module embedded in a professional camera.
Figure 5:
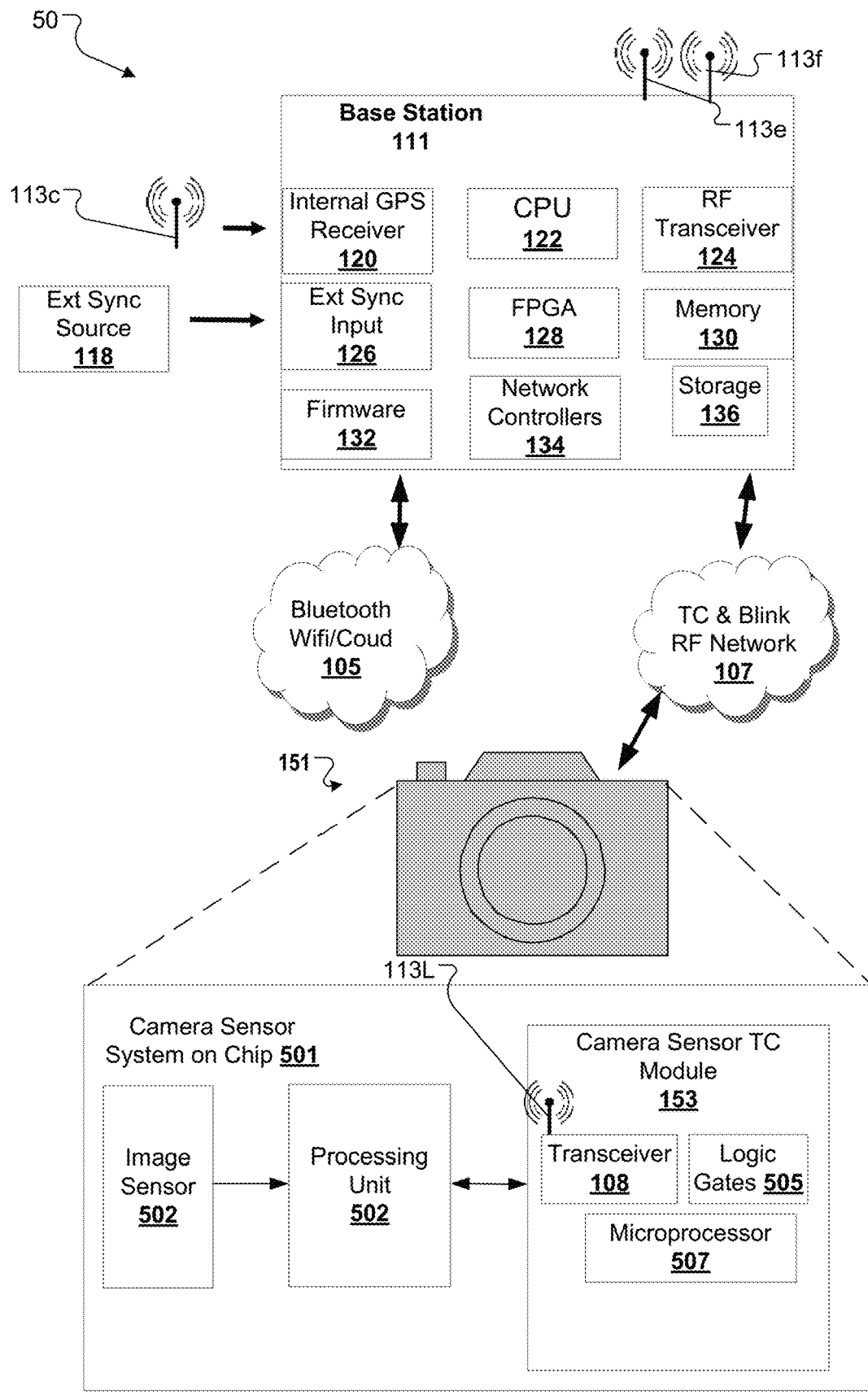
FIG. 5 shows a personal camera having a sensor system on chip (SOC) including a timecode module.

For clarity, the system 12 is simplified to show the personal devices 121 and 131 in FIG. 2, the personal device 141 and the adapter 100 in FIG. 3, the professional cameras 146 and 152 in FIG. 4, and the personal camera 151 in FIG. 5.

Referring to FIGS. 1-3, the personal devices 121 and 141 each includes a software application 104. The software application 104 can receive and use the timecode data, status data, configuration data, and metadata created and transmitted by the base station 111. The software application 104 can also receive available metadata created by other media devices. For example, in some cases, the metadata is received by the base station 111 and then relayed over a wireless network for the software application 104 to store and use in a database. The metadata sent by the base station 111 could, for example, include useful metadata to unlock sharing of content or commercially purchased and acquired clips or music tracks.

Furthermore, the transfer of metadata from the media devices can simplify post-production processing. For example, a user can associate info or notes with specific content during filming because the logged information can simplify the identification or tracking of specific clips during post-production. The logged information becomes 'searchable metadata'. To allow this user input content to be re-linked with the original media files, identifiers can be embedded to enable the software to find the correct notes for the correct media clips. The transmitted or stored data and the metadata from the recording camera can function as these key identifiers, which enables re-linking in standard non-linear editing ("NLE") systems and/or third-party logging applications. Simply put, the final timecode file can be embedded with inserted metadata (e.g., from the BLINK network) in a video format (e.g., mp4).

The media devices can receive data electrical signals and waveforms packets that allow reconstruction of timecode, genlock and configuration data is transmitted by the base station 111 through any one of the antennas 113.

In some cases, a personal device can also include or be electrically connected to a version of a synchronization module (e.g., a timecode module 114, a timecode hardwire module 148, or a timecode sensor module 115), which enables communication over an RF network, (e.g., the BLINK network 107).

The timecode module 114 and the timecode hardwire module 148 are generally similar, except for differences in the firmware versions programmed onto the respective FPGAs. In some cases, the physical form of the synchronization module is also adapted to the desired personal device. For example, the various firmware versions are configured to enable a timecode module to communicate with the desired device and the firmware versions account for hardware (e.g., the connector type) and communication protocols of the desired device. As will be discussed elsewhere, the synchronization modules can include FPGA. The timecode sensor module 115, however, is part of a camera sensor on a chip (SOC), and, therefore, cannot be reconfigured after manufacture. Instead, in some cases, the logic gates of the FPGA are manufactured directly onto the SOC.

For example, the timecode module 114 of the personal device 150 (e.g., a GoPro Hero4 camera) is configured to communicate directly with the HERO4 HeroBus multi-pin connector. In this example, the physical form factor of the module 114 can also be designed to clip on to the HERO4 as a 'BacPac' design. In this example, apart from these differences, the functionality is similar between the module 114 and the timecode hardwire module 148.

In another example, the differences between the timecode module 114 in the adapter 100 and the timecode module 114 of the personal device 150 can be found in the firmware to communicate with the different electrical interfaces of the personal device 150 (e.g., a GoPro HERO 6 30 pin HeroBus connector) and the personal device 141 (e.g., an Apple Lightning connector or an Android micro USB connector) for example.

While the timecode module is generally shown as an internal component within a media device, other implementations are possible. For example, the timecode module can be removable from the media device. In other examples, the timecode module can be an external module electrically connected to the camera.

By way of overview, a synchronization module receives accurate timecode and sync information. For example, the synchronization module syncs from an external RF source (e.g., a base station) of timecode information (e.g., BLINK data packets). The synchronization module participates in a 2-way-communication with the base station 111, and the synchronization module communicates with an associated personal device (HERO4, iPhone, or tablet) to embed the timecode and/or sync information into the recorded media of the personal device and, in some cases, to offer remote control of the associated personal device via the BLINK network.

FIG. 1 shows examples of each of the synchronization modules and an associated personal device. The synchronization modules (e.g., the timecode module, the Wi-Fi modules, the hardwire timecode modules, and any combination thereof) can be used to either transmit the accurate synchronization and configuration data to other devices when operating in a control mode (e.g., a "master" mode), or to receive highly accurate synchronization or configuration data from another device when operating in a dependent mode (e.g., in "slave" mode). In operation, for example, the base station 111 provides timecode and sync data to any one of the timecode modules 114, 148, or 153 or the software application 104, which is relayed to its respective media device (e.g., the devices 121, 131, 141, 146 150, or 152). In this example, the media devices are configured as devices operating in a "slave" or dependent mode while the base station 111 is operating in a "master" or control mode.

All or part of the processes can be implemented as, special purpose logic circuitry, e.g., an FPGA and/or an application-specific integrated circuit (ASIC).

Referring to FIGS. 1 and 2, the personal device 131 includes a timecode module 114, a communication module 102, and a decoder module 109. The decoder module 109 can include an API protocol or similar mechanism that is configured to process a timecode package generated by a synchronization module (e.g., the timecode module 114, the timecode hardwire module 148, or the sensor timecode module 153) to obtain timecode data. In some examples, the decoder 109 is also configured to process synchronization data (e.g., genlock data).

The timecode module 114 includes an internal RF transceiver (e.g., the RF transceiver 108), and an FPGA 110. The FPGA 110 is used to encode, decode the RF sync data packets, and also derive the necessary signal waveforms for cameras and sound synchronization input circuitry.

Referring to FIG. 1, the personal camera 150 (e.g., a Hero4 camera by GOPRO includes the timecode module 114, which enables the personal camera 150 to exchange information with the base station 111 over the BLINK network 107. In this example, the timecode data is embedded on an SD card of the personal camera 150 so that the SD card can be removed and later processed. In this case, the media is recorded with embedded timecode information. In some cases, 2-way metadata, control, and status are transmitted to and from the base station 111. The timecode module 114 (also known as Timecode Systems SyncBac PRO, Timecode Systems SyncBac or GoPro HERO 6 timecode module) has an internal RF antenna 113 and a user selectable external antenna port for longer reception range.

In some examples, initial sync lock accuracy between the base station 111 and the timecode module 114 or the timecode hardwire module 148 is about 20 microseconds and subsequently improves to a lock accuracy of 1 to 7 microseconds after approximately 1 minute.

The RF transceiver 108 enables the adapter 100 to communicate with the base station 111 over the BLINK network 107. The frequency band that the RF transceiver 108 uses for data communication is a sub-GHz long range robust data format. For example, the adapter 100 can communicate with the base station 111 using the ISM-sub-GHz band (865 MHz to 928 MHz). The sub-GHz long-range robust data format (also referred to as a BLINK protocol) may include the protocol described in U.S. Application No. 62/240,352, filed on Oct. 12, 2015, which is incorporated by reference in its entirety.

The difference between the software application 104 and the timecode module 114 is that the software application 104 decodes the timecode data via the Wi-Fi interface and software, whereas the timecode module 114 decodes the timecode and sync data via the RF transceiver 108 and the FPGA 110. By decoding the timecode and sync data via the transceiver 108 and the FPGA 110, the timecode module 114 may improve accuracy than simply relying on the software 104 alone. For example, if the Wi-Fi Timecode Signal is sent to the software application 104 on a personal device (e.g., an iPhone, iPad, smartphone, or tablet), there can be an accuracy of around 30 milliseconds drift between all units 'listening' and the master. In contrast, if a timecode synchronization module (e.g., the timecode module 114) is available to decode the RF data packets of the BLINK network (microprocessor and FPGA), there is an improved accuracy of 1 to 7 microseconds drift between 'listening' units and the master.

Referring to FIGS. 1 and 3, the personal device 141 is connected to an adapter 100 via a connector 106 (e.g., a micro-USB or lightning connector). The adapter 100 includes a housing 101, a timecode module 114, a memory card port 116, and a battery 117. The memory card port 116 is a physical port allowing the adapter 100 to use external flash memory cards including SD, mini-SD, micro-SD, or any other similar format. The memory card port 116 is configured to receive media embedded with timecode information from the timecode module 114 for storage. In some cases, the embedded data can additionally or alternatively be streamed over a network via 3G/4G/Wi-Fi as H.265, H.264 for example.

The personal device is connected 702 to the adapter using a mechanical and electrical connection. For example, an iPhone can be electrically connected to the adapter using a lightning compatible connection. Additionally, the adapter can include another connection mechanism to temporarily retain the personal device within the housing.

The battery 117 is the primary source of power for the adapter 100. In some cases, the battery 117 can charge the personal device 141 via the connector 106. As shown in FIG. 3, the personal device 141 is removable from the adapter 100. The housing 101 includes an opening 202 sized to receive the personal device 141. In some cases, the opening 202, is sized to receive a phone or a tablet, for example.

Referring to FIGS. 1 and 4, the professional cameras 146 and 152 each includes a timecode hardwire module 148. As shown in FIG. 1, the timecode module 148 can be embedded or connected to a camera. For example, the timecode hardwire module 148 is embedded within the professional camera 152 and connected to the professional camera 146. In some cases, the timecode hardwire module 148 includes a communication module 102 that allows the base station 111 to send timecode data 402 and/or sync data 404 over a wireless network. Because the timecode hardwire module can be directly connected with the camera processors, the professional cameras 146, 152 can be synchronized (e.g., genlocked) with another camera that is also in communication with the base station 111.

If a camera also includes a similar communication module, the camera's communication module can be used to communicate with the base station 111. In some examples, the timecode module 148 will not include the communication module 102 if, for example, the camera's communication module can be used.

In some examples, the timecode module 114 or the timecode hardwire module 148 includes an internal clock. If the RF signal from the base station 111 is corrupt or out of range, then the timecode module 114 or the timecode hardware module 148 rely on their respective internal clocks. When the timecode module 114 or the timecode hardwire module 148 receives reliable data packets from the base station 111, the transceivers 150a-c can soft-sync back to lock with a master device (e.g., the base station 111). For example, the accurate internal generator (e.g., internal clock) of the timecode module 114 or the timecode hardwire module 148 is constantly soft-synced from the received and decoded RE data packets when the timecode) module 114 or the timecode hardwire module 148 are operating in slave mode. This helps to keep the internal clocks in phase or synchronized with the other system devices to reduce possible drift when the timecode module 114 or the timecode hardwire module 148 lose contact with the base station 111.

Referring to FIG. 1 and FIG. 5, the camera 151 includes an exemplary sensor system on chip (SOC) 501. The SOC 501 generally includes one or more image sensors 502 (e.g., CMOS sensors) and a signal processing unit 505. Conventional SOCs encode media data into standard video streams (e.g., in an H24, MPEG format). The SOC 501 also includes a sensor timecode module 153 embedded in the SOC 501. The sensor timecode module 153 includes an RF transceiver 108 for communicating (e.g., exchanging timecode and data packets) with a base station over the BLINK network, for example. The sensor module 153 also includes multiple logic gates 505 that are embedded into the sensor timecode module 153 during manufacturing of the SOC 501. These logic gates 505 are generally arranged to function as the logic gates of the FPGAs described throughout this disclosure. This means that the logic gates 505 also function to encode and/or decode the RF sync data packets and also to derive the necessary signal waveforms for cameras and sound synchronization input circuitry. To modify the function of the logic gates 505, a new SOC would be required as they are not "reprogrammable" in the manner that an FPGA is. The sensor timecode module 153 can also optionally include a microprocessor 507 to support the timecode data processing.

The image sensors 502 send acquired image and/or video data to the signal processing unit 505. The timecode sensor module 153 also sends timecode and/or synchronization data (e.g., genlock data) to the signal-processing unit 505. This enables the processing unit 505 to generate a stream of the acquired media data that already includes the timecode data. When a device receives this data stream, additional processing (e.g., decoding) is not required to associate the timecode data with the acquired media data.

In addition, the timecode sensor module 153 is in direct communication with the processing unit 505 that controls the image sensors 502. Therefore, when the timecode sensor module 153 receives synchronization data, this communication can be sent to the processing unit, which can then synchronize (e.g., genlock) the camera with another device (e.g., another camera that also communicates with the base station.

In some cases, the SOC 501 is optimized to reduce any redundant circuitry and logic by sharing circuitry and logic between the various components of the SOC 501.

Referring again to FIG. 1, the base station 111 is a networked programmable timecode generator. The device is intended to be moveable between sites and stationary during use. For example, the device can be installed in a rack-mountable format for semi or permanent installation, which is compatible with a motion picture filming location, permanent venue, or temporary venue. The base station 111 may generate timecode data through a temperature compensated crystal oscillator ("TCXO") reference oscillator, an oven-controlled crystal oscillator ("OXCO") reference oscillator, a rubidium atomic clock, GPS time, NTP, or similar technology. The base station 111 generates data using an internal master clock or using external time information while simultaneously distributing, via wired and wireless networks, timecode, synchronization data and/or control data to networked devices needing timecode data. In some cases, the base station can gather camera status information using a closed network (e.g., an RF network), and display this compiled information over a graphical user interface ("GUI") of a computing device. This status information can include SD card status, battery status, recording status or a combination thereof.

The CPU 122 serves as the primary microprocessor for the base station 111 and can have a single or multiple cores. The CPU 122 may include one or more microprocessors and/or processing devices. The CPU 122 may include any appropriate processor and/or logic that are capable of receiving and storing data, and of communicating over a network.

The memory 130 is the primary memory component for the base station 111 and can be SRAM, DRAM, or any other standard volatile or non-volatile memory. For example, the memory 130 can include a hard drive and a random access memory storage device, such as a dynamic random access memory, machine-readable media, machine-readable hardware storage devices, or other types of non-transitory machine-readable storage devices.

In some cases, the base station 111 receives external synchronization input 126 from an external sync source 118. Additionally or alternatively, the base station 13 can receive external timing information using a GPS receiver 120.

The FPGA 128 and the firmware 132 function as the control program or firmware for the generation of timecode and sync data, and for the RF transceiver 124. The frequency band that RF transceiver 124 of the base station 111 uses for data communication is a sub-GHz long range robust data format. For example, the base station 111 can communicate with the system devices using the ISM-sub-GHz band (865 MHz to 928 MHz). The sub-GHz long range robust data format (also referred to as a BLINK protocol) can be the protocol described in U.S. Application No. 62/240,352, filed on Oct. 12, 2015, which is incorporated by reference in its entirety. The base station 111 can transfer timing data and configuration data within data packets using the BLINK protocol over the BLINK network 107. In between the timing data packets, the base station 111 can receive or send configuration or status information from other devices (e.g., cameras, sound devices, and lens devices) over the BLINK network 107.

Figure 6:
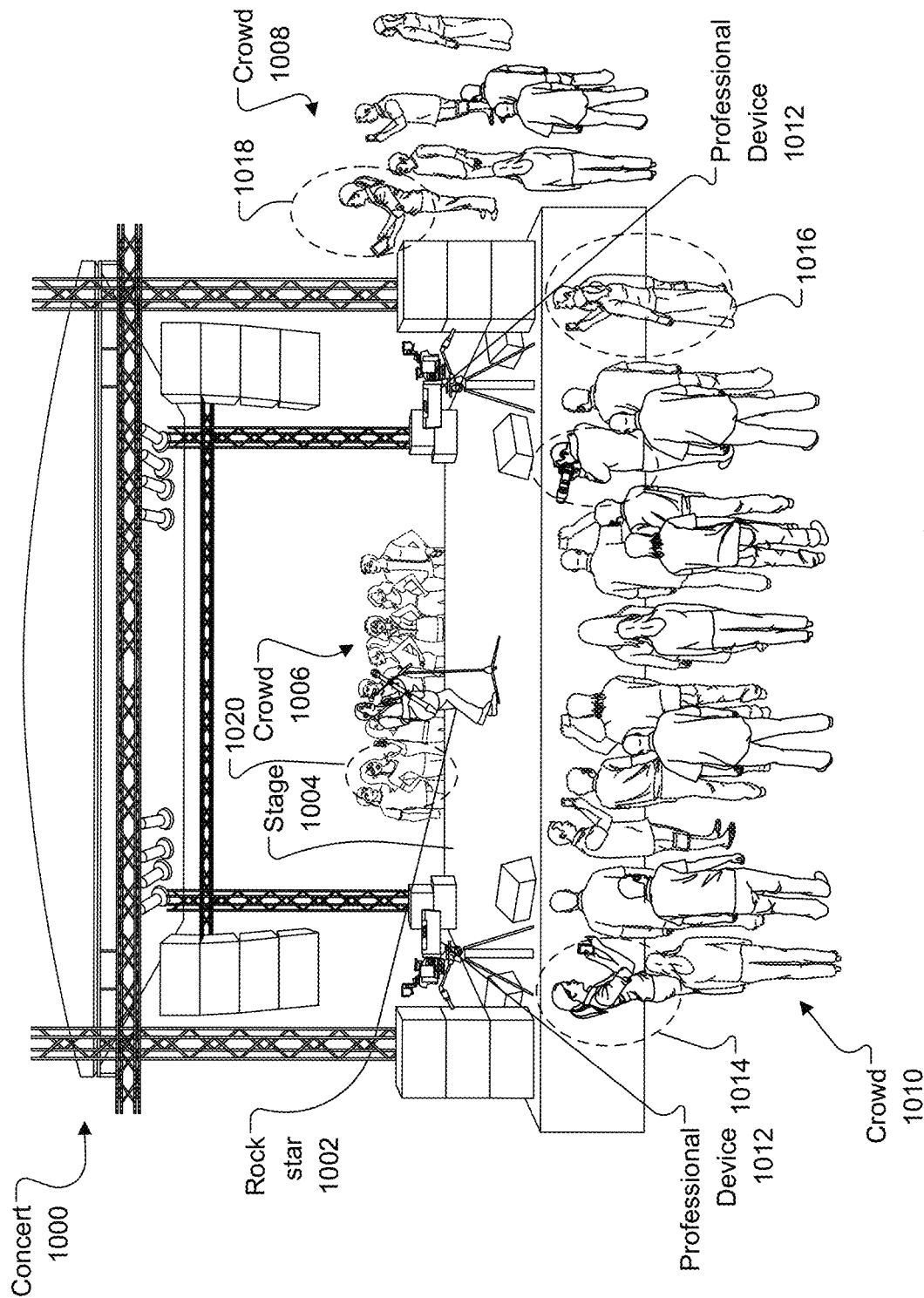
FIG. 6 shows a concert as an exemplary environment in which synchronization across multiple devices can be useful.

FIG. 6 shows a concert as an exemplary environment in which synchronization across multiple devices can be useful. For example, at a concert 1000 groups of consumers are positioned around a stage 1004 (e.g., crowds 1006, 1008, or 1010) to watch a performer 1002. In this example, the consumers 1014, 1016, 1018, and 1020 are each using a personal device. The concert is also recorded by one or more professional devices 1012. In some cases, the consumers 1014, 1016, 1018, and 1020 can upload media content (e.g., video information) using one or more personal devices described above. The media content is pre-synchronized and associated (e.g., embedded) with timecode and metadata and can be uploaded to a social media cloud-based platform, for example. Based on the connection and a user preference, a consumer can initiate such an upload from internal memory, over a live stream, and/or from an external memory card. FIGS. 7-11 further illustrate the use of a personal device at the concert 1000. For clarity, the concert 1000 is simplified in each of these figures. The personal devices can be selected from the personal devices discussed above. For example, a personal device shown in communication over the wireless network 105 and the BLINK network 107 could be the phone 141 connected to the adapter 100 or the phone 131 with the internal timecode module 114. In other cases, a personal device shown in communication over the network 105 could be the phone 121. The professional devices can be, for example, the camera 146 and the camera 152.

Figure 7:
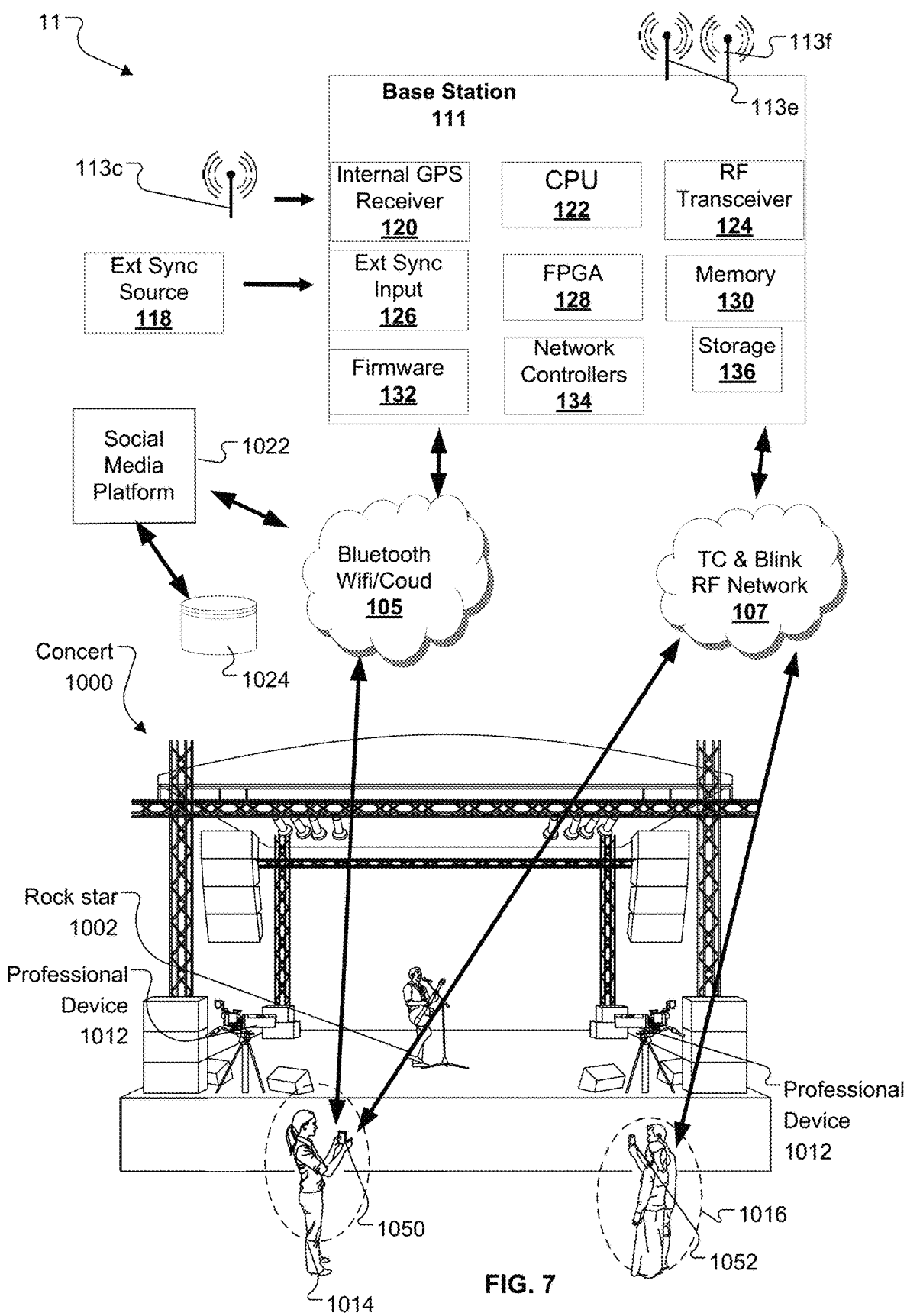
FIG. 7 shows multiple consumers using personal devices with a base station at the concert shown in FIG. 6.

FIG. 7 shows the use of a personal device at the concert shown in FIG. 6. In this example, the consumer 1014 is using a personal device 1050 to record (e.g., audio and/or visual) the concert 1000. The personal device 1050 is shown in communication with the base station 111 over the wireless network 105 and the BLINK network 107. In this example, the consumers 1016 are using a personal device 1052 to photograph themselves and the personal device 1052 is shown in communication with the base station 111 over the BLINK network 107. Using the wireless network 105, the consumer 1014 can upload the captured media to a social media platform 1022 (e.g., YOUTUBE, FACEBOOK, TWITTER, etc.). The social media platform 1022 can store the media (e.g., in a database 1024) for the user 1012 and/or for other users. The consumers 1016 can, for example, upload recorded media (e.g., photographs or video) from the device 1052 at another time or location (e.g., at home).

Figure 8:
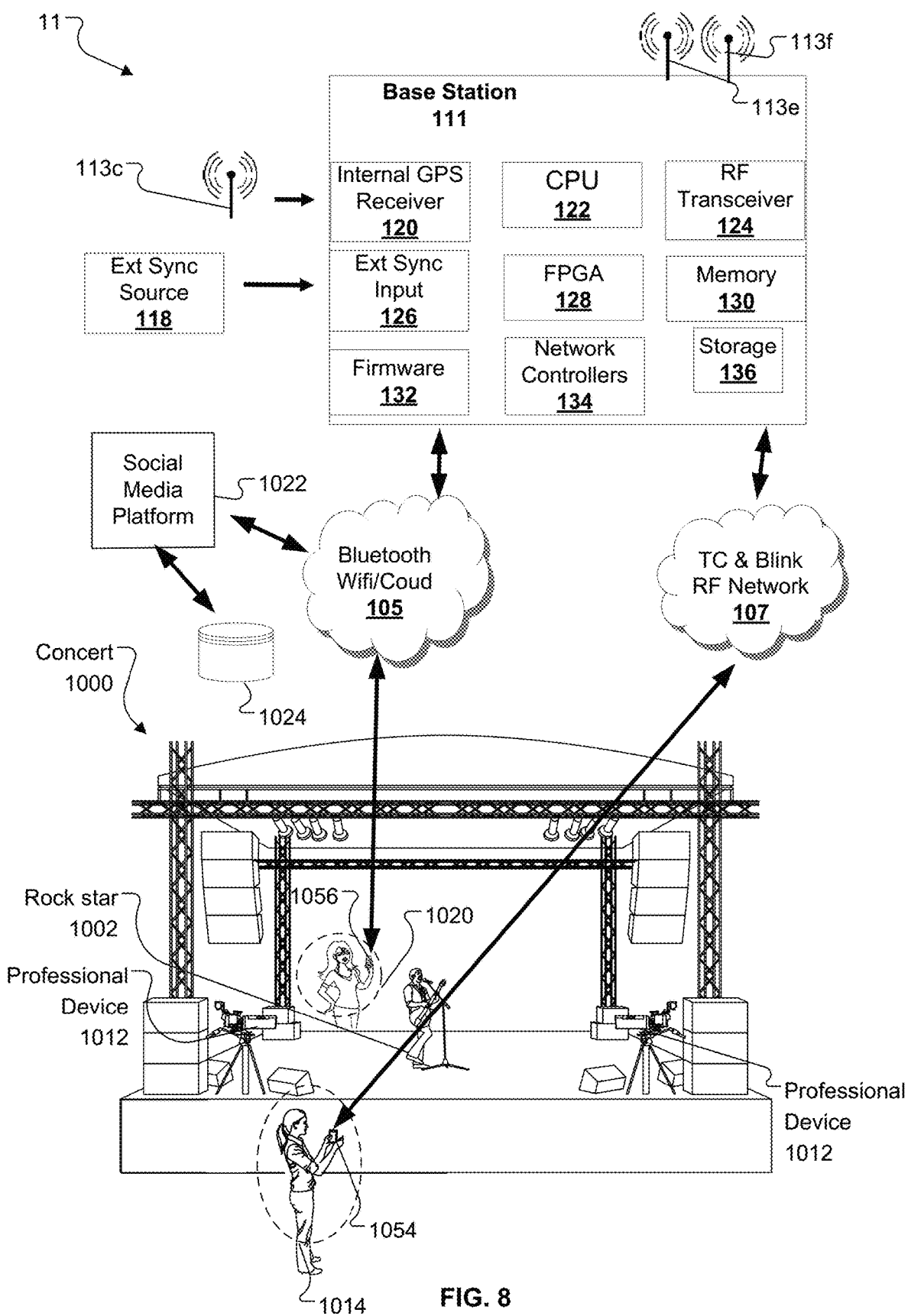
FIG. 8 shows multiple consumers using personal devices at the concert shown in FIG. 6.

In some implementations, a consumer may use a personal device connected to one network and consumers at the same event may access different networks. For example, FIG. 8 shows the use of personal devices at the concert shown in FIG. 6. In this example, the concert 1000 is recorded (e.g., audio and/or visual) by the consumer 1014 using a personal device 1054 and by the consumer 1020 using a personal device 1056. The personal device 1054 is in communication with the base station 111 over the network BLINK 107. Therefore, the base station 111 can exchange timecode information with the personal device 1054. This timecode data can be stored with the acquired media data for local processing by the user and/or for uploading to different platform at another time or location. The personal device 156 is in communication with the base station 111 over the wireless network 107. In this case, the personal device can receive timecode information, for example, from the base station 111 and upload media to the social media platform 1022 over the wireless network 105.

Figure 9:
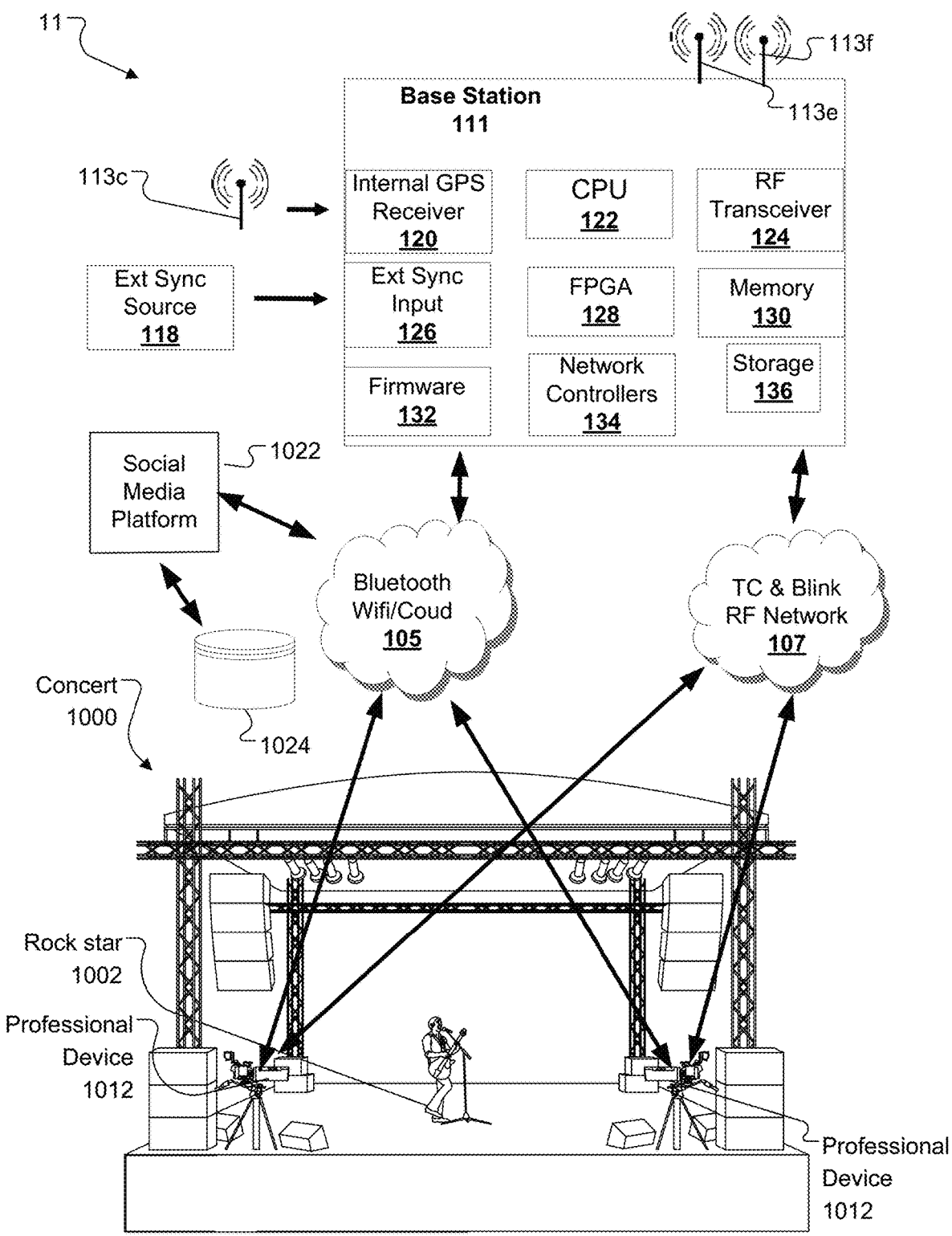
FIG. 9 shows the use of professional cameras at the concert shown in FIG. 6.

FIG. 9 shows the use of a personal device at the concert shown in FIG. 6. In this example, the concert 1000 is recorded (e.g., audio and/or visual) by the professional devices 1012. The professional cameras 1012 are shown in communication with the base station 111 over the wireless network 105 and the BLINK network 107. Using the wireless network 015, professional media content, including professionally generated camera content and/or professional audio content (e.g., the music track mixes of a band or performer), can be uploaded to the social media platform 1022. Using information from the base station 111, the acquired media can be pre-synchronized media with timecode and metadata as discussed throughout this disclosure.

Acquired media data is not limited to footage of the actual performance. In some cases, the event hosts (e.g., a band, event producer, stadium owner, or football team) can also upload behind the scenes material (e.g., from dressing rooms or acquired using selfie style vlogs) to the social media platform 1022 as 'additional content' for the consumer to purchase to add to media project (e.g., their 'story edit').

Figure 10:
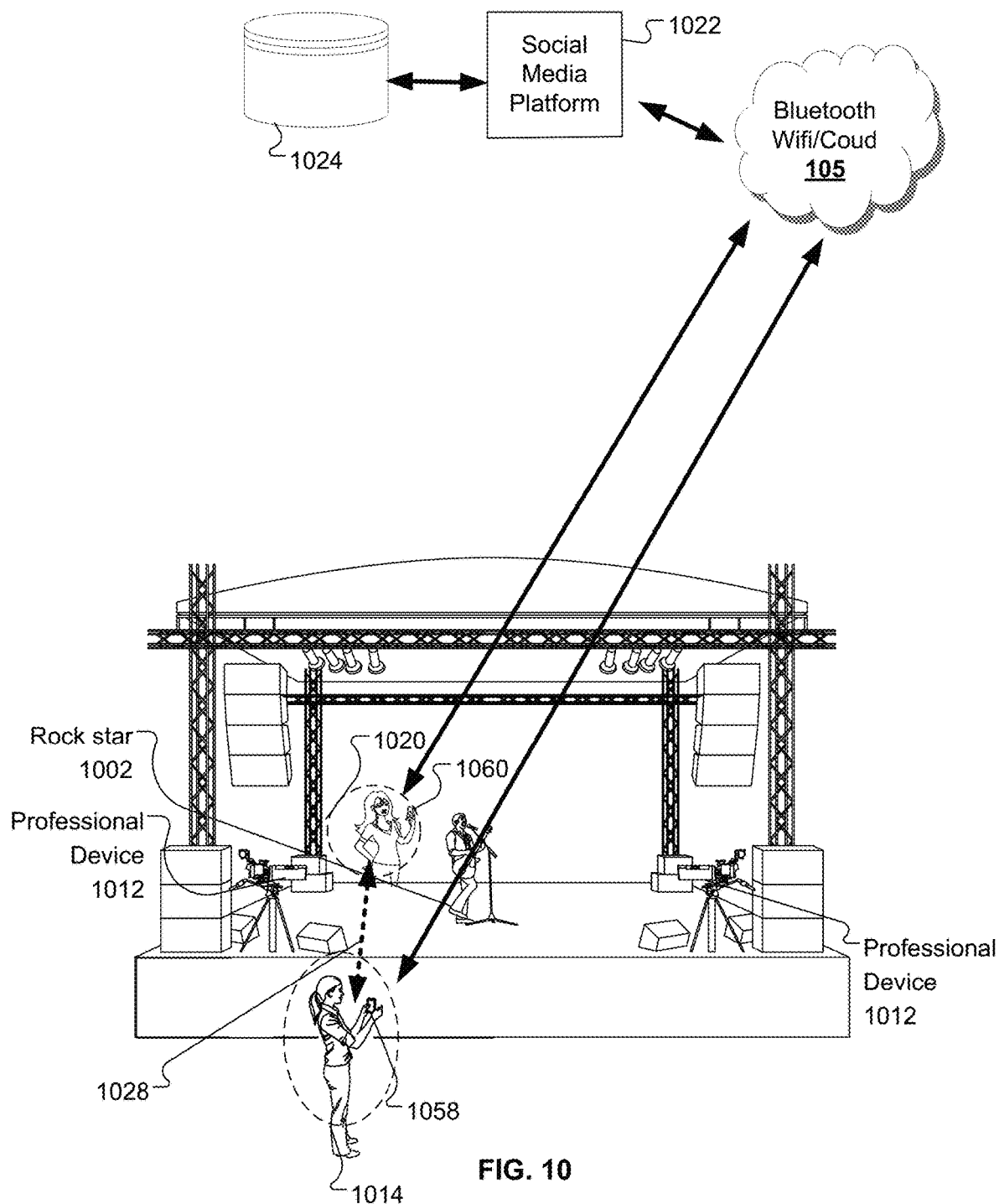
FIG. 10 shows the use of personal devices at the concert shown in FIG. 6 without a base station.

While the personal devices are generally shown in communication with a base station, in some cases, the personal devices can additionally or alternatively synchronize with other personal devices without a base station. For example, as shown in FIG. 10, the personal devices 1058 and 1060 are synchronized with each other (as indicated by a dashed arrow 1028) without a base station. In this example, the concert 1000 is recorded (e.g., audio and/or visual) by the consumer 1014 using a personal device 1058 and by the consumer 1014 using a personal device 1060. In this example, the personal devices 1058 and 1060 are able to synchronize with each other without the base station 111 because at least one timecode module associated with either personal device 1058 or 1060 assumes a master clock device role and creates a local RF network. The other local devices (e.g., other personal devices) in range continue to function as slave devices in response to the personal device acting as a master personal device (rather than the base station as described in FIGS. 6-9) In effect, one of the personal devices becomes a low powered portability base station. The RF network created could be from the BLINK sub-GHz transceiver of a timecode module or could generate using a protocol based on the built-in wireless capabilities of the personal device (e.g., Wi-Fi, and/or Bluetooth). As with the BLINK network 107, the RF network is produced (using a SubGHz transceiver) to transmit or receive data based on protocols in software and firmware of the timecode module. Using the wireless network 105, the personal devices 1058 and 1060 can ultimately upload acquired media data that is pre-synchronized (e.g., embedded with timecode information) to a social media platform 1022.

In some examples, the recorded media content includes GPS information. An internal source (e.g., an internal GPS module within the personal device) or an external source (e.g., the base station or an adapter) can provide this GPS information. Embedding GPS information within the media data helps streamline a user's to 'share' media content (e.g., in a cloud-based-platform) with other users (e.g., friends, users, strangers) at the same event.

In some examples, the cloud-based-platform can facilitate sharing content with attendees at the same event using facial recognition in combination with the GPS information. In this case, a user can find footage in which they feature. Because the acquired media is synchronized before upload, a user of the cloud-based-platform can access their original media and any media featuring their face. For example, a user can also identify any foreign media (i.e., recorded by another consumer or user) that is contemporaneous with their recorded media. In other words, for the same moment, a user can access both footage of the stage and other footage featuring their face.

Figure 11:
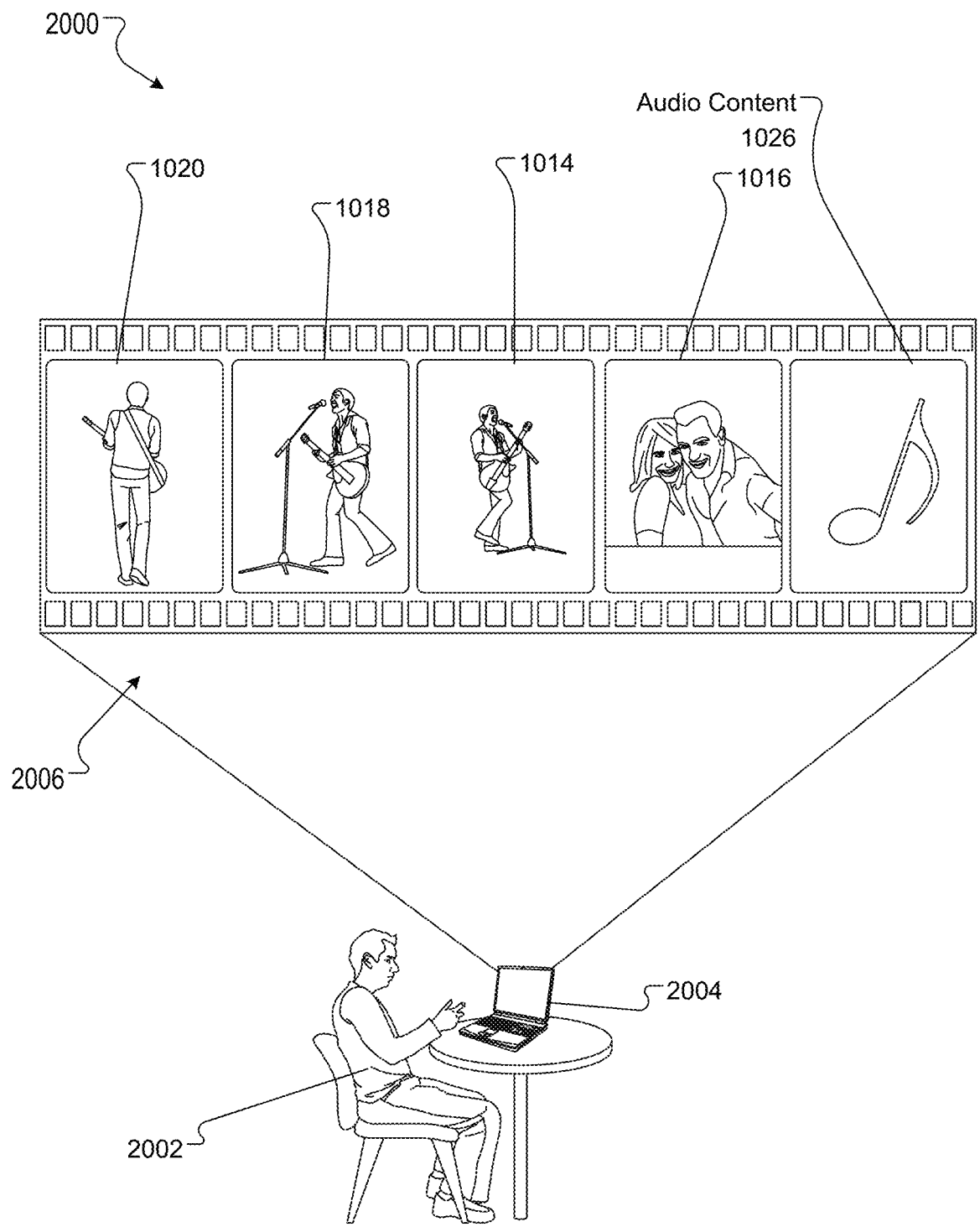
FIG. 11 shows a user acquiring media of the concert shown in FIG. 6 from multiple sources.

FIG. 11 shows an environment 2000 including a user 2002 acquiring media 2006 from multiple sources (e.g., acquired by multiple devices and/or users). In this example, the user 2002 can access media data acquired by consumers 1020, 1016, 1014, and 1016 (as shown in FIG. 7-FIG. 10). Additionally, the user 2002 can access other data (e.g., the audio data 1026). The audio data 1026 could be recorded by another consumer or professionally recorded by, for example, the event hosts or the performer. The user 2002 can edit the acquired media 2006 within the cloud-based-editing platform (e.g., YOUTUBE), can upload their content, download other consumer content, pay for professional ('pro') content like pro camera angles and music tracks, or perform a combination of these actions.

In some cases, consumers can upload their content from an event to a cloud-based platform, and the user 2002 is a professional broadcaster purchasing the consumer content to include in promotional material (e.g., in a commercially sold professional content or program.)

Again, this media is pre-synchronized, which supports a true multi-camera recording of the same event.

While FIGS. 7-11 illustrate a concert, this disclosure is equally relevant to other events (e.g., sporting games, parades, group trips, and other performance events).

Figure 12:
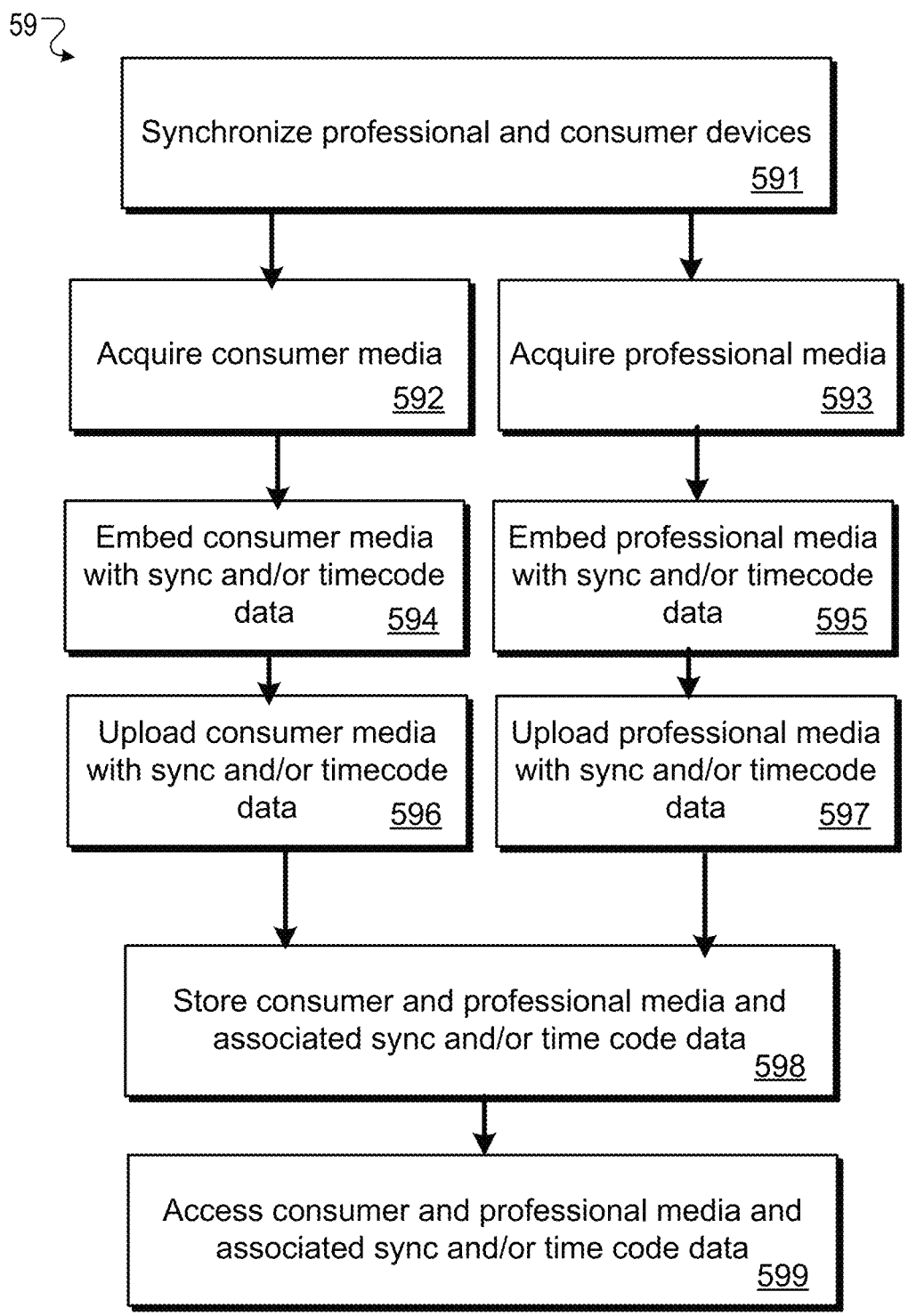
FIG. 12 is a flow chart diagraming an example process for acquiring media of the same event from multiple devices.

FIG. 12 shows an example method for acquiring contemporaneous media of the same event from consumer and professional devices. Initially, personal devices and professional devices are synchronized 591. In some cases, the devices receive synchronization information from an external device (e.g., from a base station and/or from an external source) over one or more wireless networks. Synchronization can include a continuous exchange or intermittent exchange of information. After synchronization is at least initiated, consumer media (i.e., media acquired using a consumer-grade device) is acquired 592 using a personal device. At the same time, professional media is acquired 593 using a professional device. To associate the synchronization information with the acquired media, the synchronization information can be embedded 594, 595 media stream acquired by the personal device and by the professional device, respectively. For each device, the media the associated synchronization information can be uploaded 596, 597 to a social media platform and stored 598. A user of the platform can access 599 the uploaded media data for review, video editing, and/or download.

Figure 13:
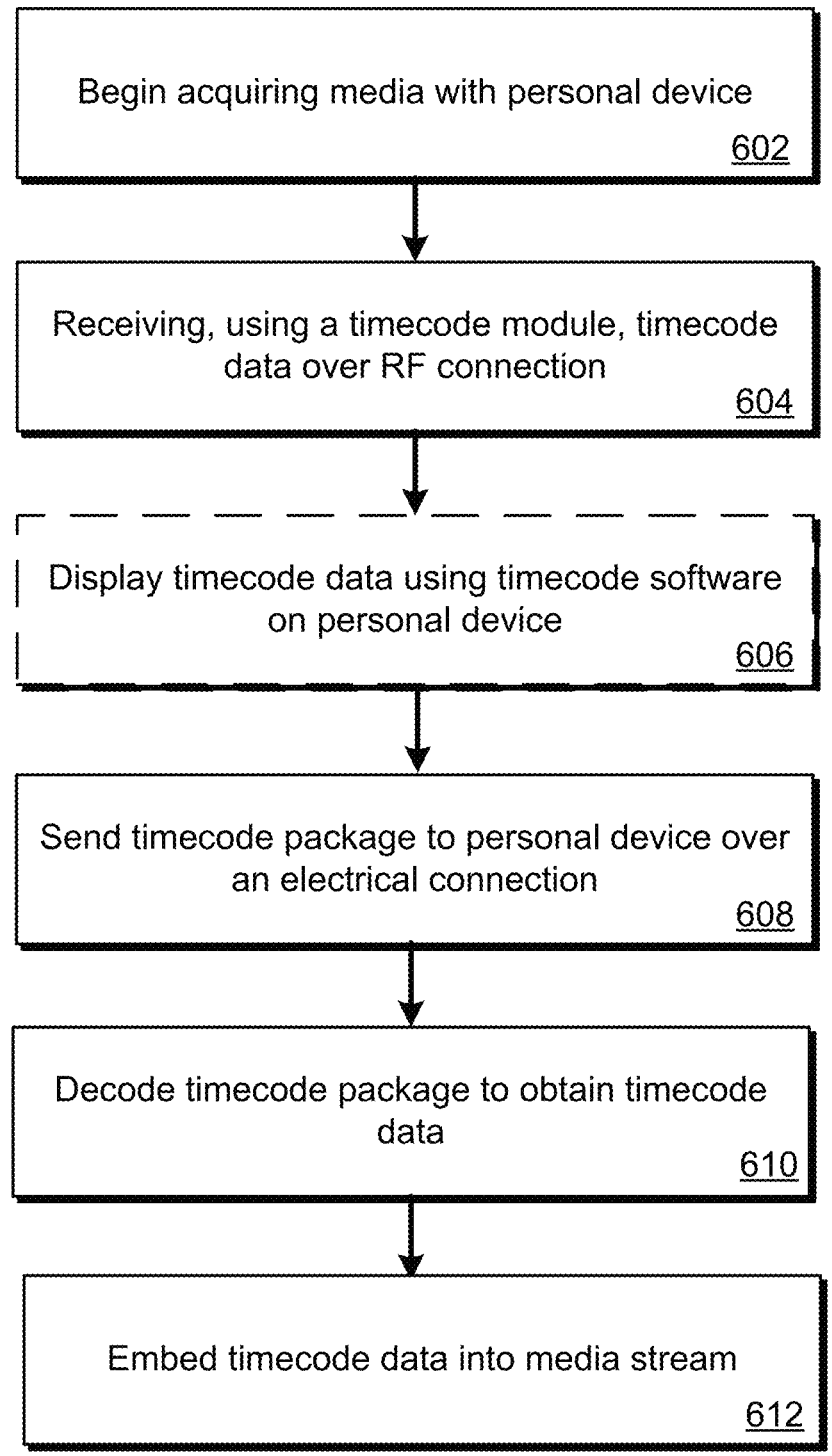
FIG. 13 is a flow chart diagraming an example process for acquiring timecode information and embedding the timecode information into a media stream.
Figure 14:
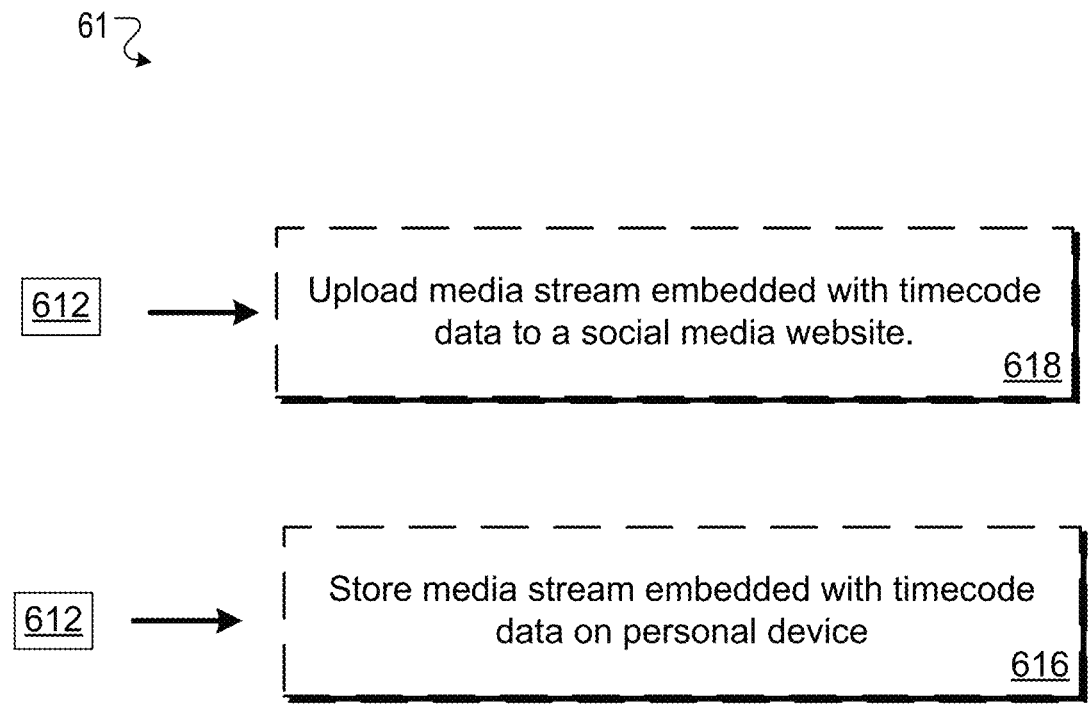
FIG. 14 is a flow chart diagraming additional optional steps following embedding the timecode information into the media stream.

FIG. 13 shows a method 60 for synchronizing a personal device to a timecode generator. Initially, media (e.g., audio and/or visual data) is acquired 602 with the personal device. As the personal device is acquiring media, the personal device is receiving 604 timecode data over an RF connection using a timecode module. This timecode data can optionally be displayed 606 on the personal device using a timecode software application. After receiving the timecode data, the timecode module can send 608 a timecode package to the personal device over an electrical connection. This timecode package can include the timecode data in an encoded format, for example. The personal device can then decode 610 the timecode package (e.g., using an API) to obtain the timecode data. The personal device can then embed 612 the timecode data into a media stream of the acquired media. As shown FIG. 14, the embedded media stream can optionally be uploaded 618 to a website (e.g., FACEBOOK, YOUTUBE, and TWITTER).

Figure 15:
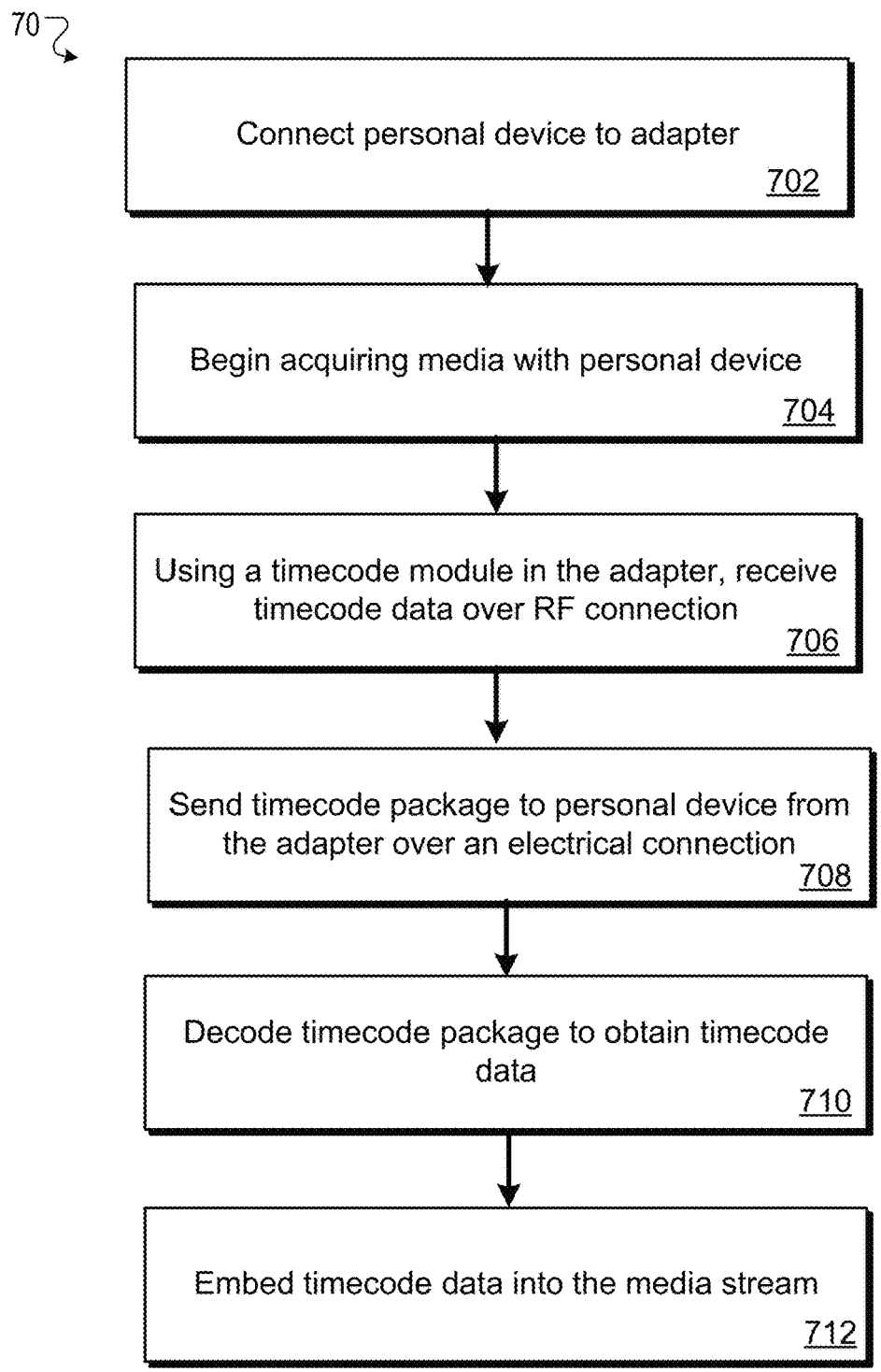
FIG. 15 is a flow chart diagraming an example process for acquiring timecode information for a personal device using an adapter with a timecode module.

Alternatively or additionally, the embedded media stream can be stored 616 on the personal device. FIG. 15 shows a method 70 for synchronizing a personal device to a timecode generator using an adapter. The personal device is connected 702 to the adapter using an electrical connector. Then, a camera of the personal device begins acquiring 704 media. The timecode module in the adapter receives 706 timecode data over an RF connection (e.g., over the BLINK network). The received timecode data can be sent 708 from the adapter to the personal device as a timecode package. The personal device can then decode 710 the timecode package to obtain the timecode data. After decoding the timecode package, the personal device can embed 712 the timecode data into a media stream of the acquired media. In other words, the personal device can generate a media stream that includes data from the acquired media and timecode data that is now associated with the acquired media.

Figure 16:
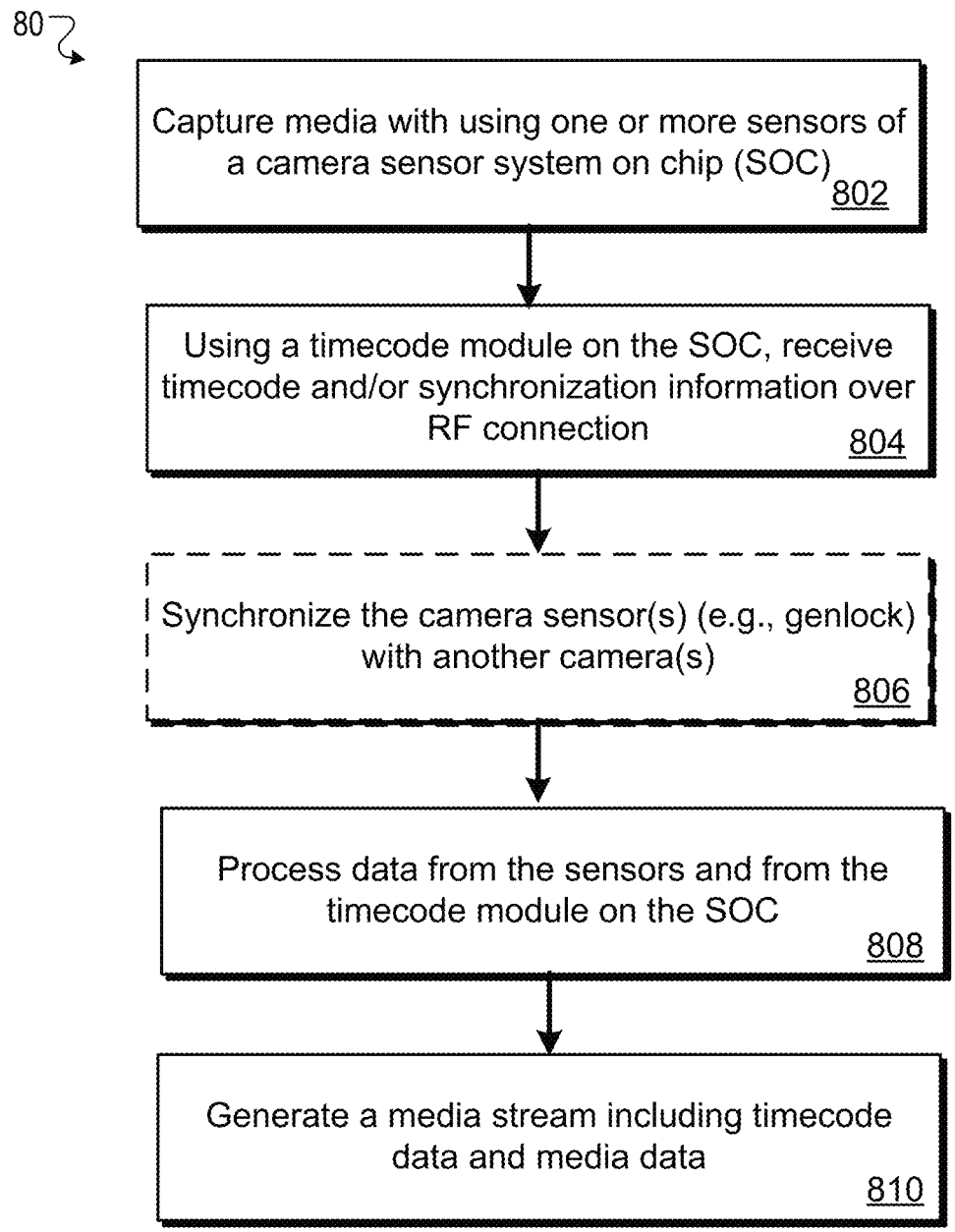
FIG. 16 is a flow chart diagraming a method of using a camera sensor chip (SOC) with a timecode module to generate a media stream including timecode and media data.

FIG. 16 shows a method 80 for synchronizing a camera to a timecode generator using a timecode module on the camera chip (e.g., a camera system on chip (SOC)). For example, a camera can acquire 802 media using one or more sensors of a camera sensor system chip (SOC). Using a timecode module on the SOC, the SOC receives 804 timecode and/or synchronization data over an RF connection (e.g., over the BLINK network). If synchronization data is received, the camera can optionally synchronize 806 the camera sensor(s) (e.g., genlock) with another camera(s). As media data and is acquired and timecode and/or synchronization data is received, the camera SOC can process 808 the data and generate 810 a media stream including the acquired media data embedded with the timecode data.

In some cases, a personal device (e.g., a mobile phone) in communication with a timecode module (through an internal or external connection) can initiate a synchronization process with a base station. For example, the personal device can detect a base station near the device. The personal device can then request timecode and/or genlock information from the base station. After the personal device receives the requested timecode and/or genlock information over a connection, the device can synchronize to the base station based on the received information. This can help to ensure that any cameras near a base station are synchronized with the base station. This can be useful during an event, for example. In some cases, the personal device can optionally record media and store the media embedded with the timecode and/or genlock information.

Figure 17:
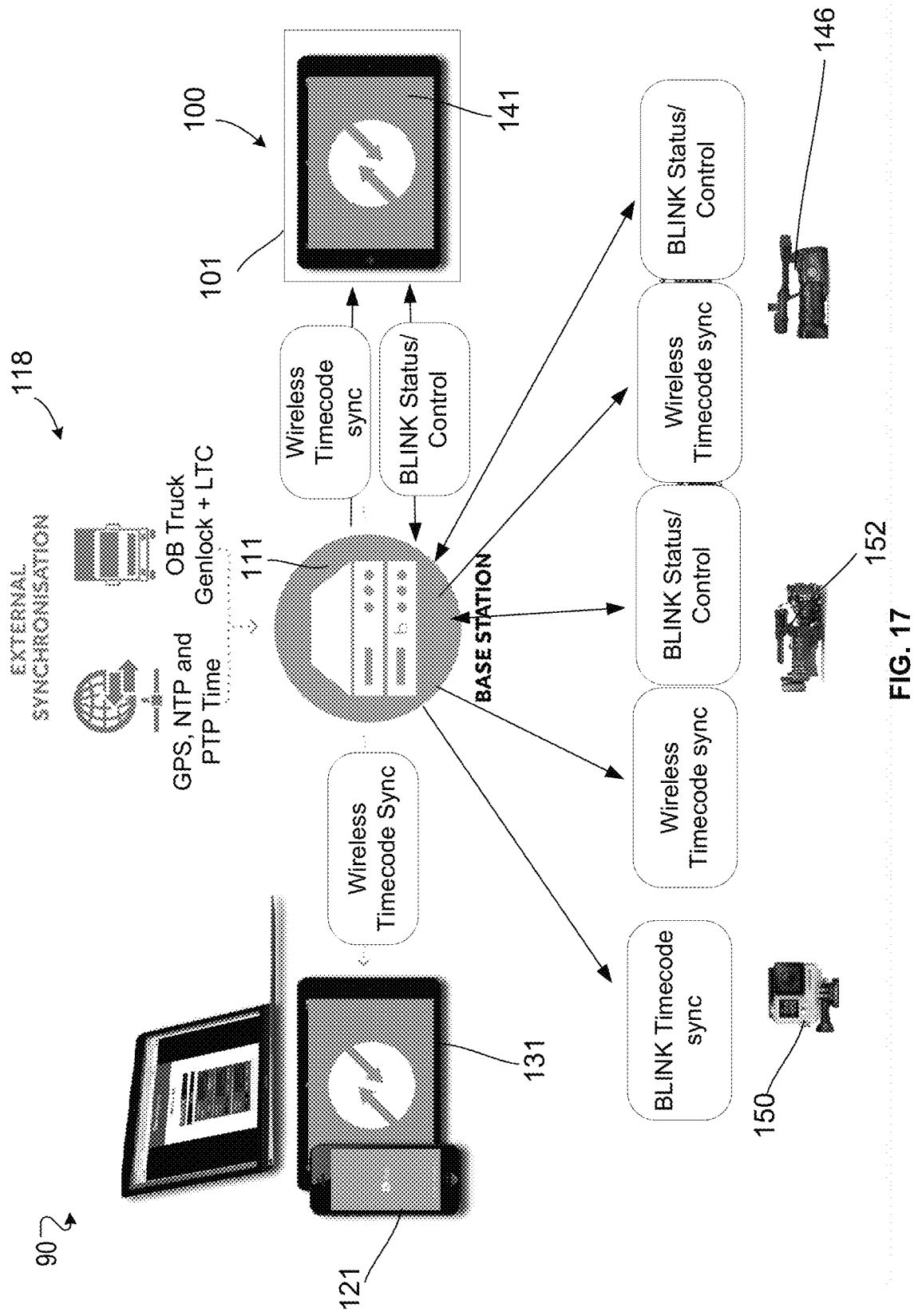
FIG. 17 shows an exemplary environment for synchronizing timecode and genlock data between multiple personal media devices and professional media devices. The synchronization and/or the media devices can be monitored and, in some cases, controlled by multiple computing devices including personal computing devices.

Referring to FIG. 17, a synchronization system 90 is shown that is configured to synchronize a combination of personal and professional cameras, communicate status, and control information from the cameras to multiple networked devices over two wireless networks. For example, the synchronization system 90 includes a personal camera 150, professional cameras 146, 152, and personal devices 121, 131, and 141.

Referring back to FIG. 3, the personal device 141 is connected to the housing 101 of the adapter 100. In this example, the base station 111 sends timecode sync information over a Wi-Fi or Bluetooth connection to the personal devices 121, 131, and 141. As shown, each of the personal devices is represented as a tablet or a smartphone. Therefore, each personal device includes a Wi-Fi or Bluetooth module without requiring modifications for compatibility with the synchronization system 401. The base station 111 can also exchange (e.g., pushing and pulling information) status and/or control information with the personal device 141 over the BLINK network based, at least on the fact that the adapter 100 includes a timecode module 114 (as shown in FIGS. 1-5).

Like the adapter 100, the timecode hardwire module 148 enables the base station to exchange status and/or control information with the professional cameras 146 and 152 over the BLINK network. As shown in FIG. 4, the timecode hardwire module 148 may be internal or external to the professional camera.

The personal camera 150 (e.g., a Hero4 cameras by GOPRO), the timecode module 114 enables the base station 111 to exchange timecode sync information over the BLINK network. In this example, the timecode data and possible metadata are embedded in an SD card of the personal camera 150 so that the SD card can be removed and later processed.

Figure 18:
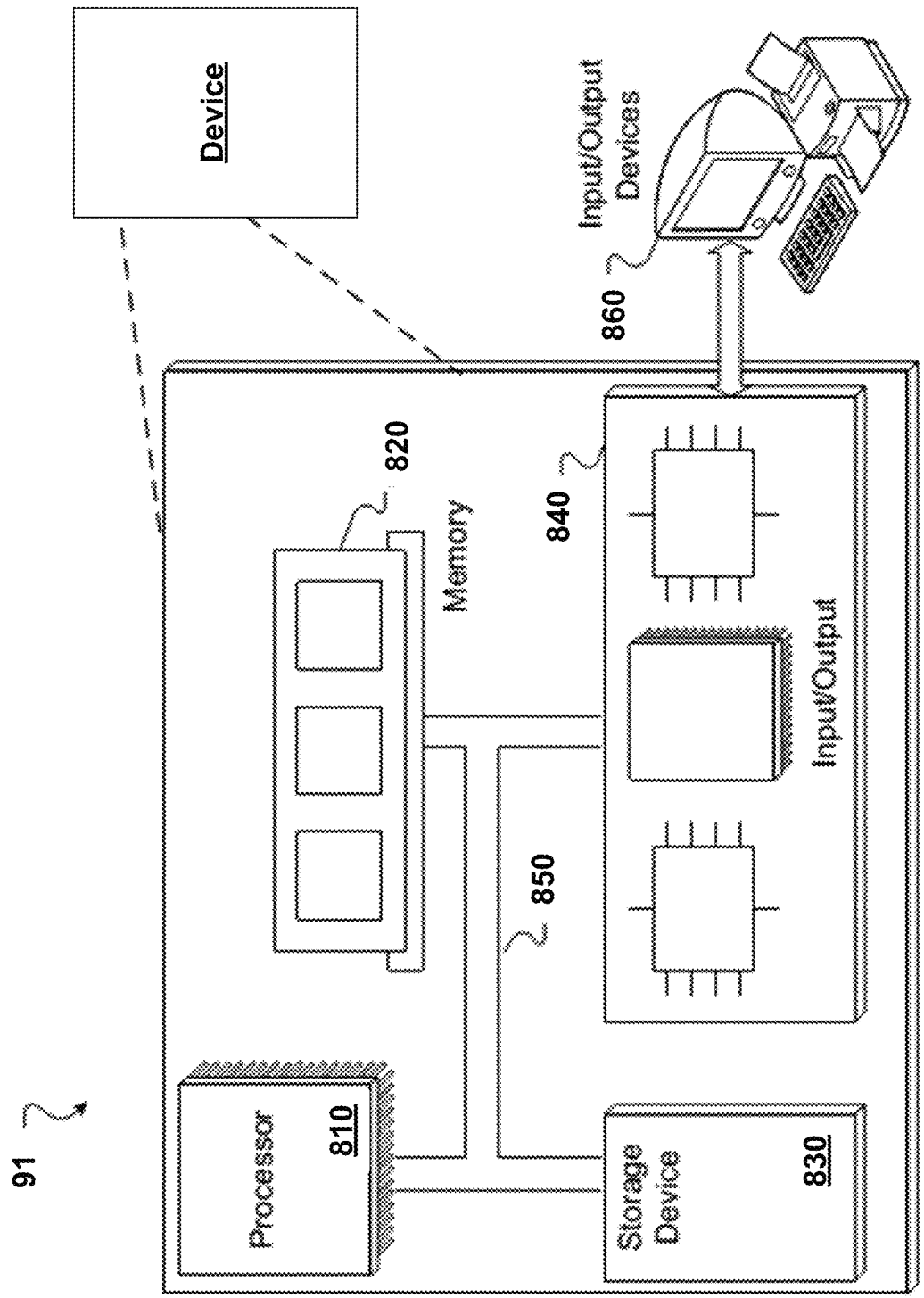
FIG. 18 shows a hardware configuration of the system shown in FIG. 1.

FIG. 18 is a block diagram of an exemplary computer system 91. For example, referring to FIG. 1, the system 12 can include the system 91. The system 800 includes a processor 810, a memory 820, a storage device 830, and an input/output device 840. Each of the components 810, 820, 830, and 840 can be interconnected, for example, using a system bus 850. The processor 810 is capable of processing instructions for execution within the system 91. In some implementations, the processor 810 is a single-threaded processor. In some implementations, the processor 810 is a multi-threaded processor. In some implementations, the processor 810 is a quantum computer. In some implementations, the processor 810 is an FPGA. In some implementations, the processor 810 is an Application Specific Integrated Circuit (ASIC). The processor 810 is capable of processing instructions stored in the memory 820 or on the storage device 830. The memory subsystem 820 may contain instructions that when executed by the processor 810, cause the system to detect a base station, request timecode and/or genlock information, and synchronize with the received timecode and/or genlock information.

Using the described components, the system 91 is operable to synchronize with a timecode generator (e.g., the device 818). The system may receive timecode and/or genlock information through the use of one or more input/output device, labeled "I/O" in FIG. 18.

Figure 19:
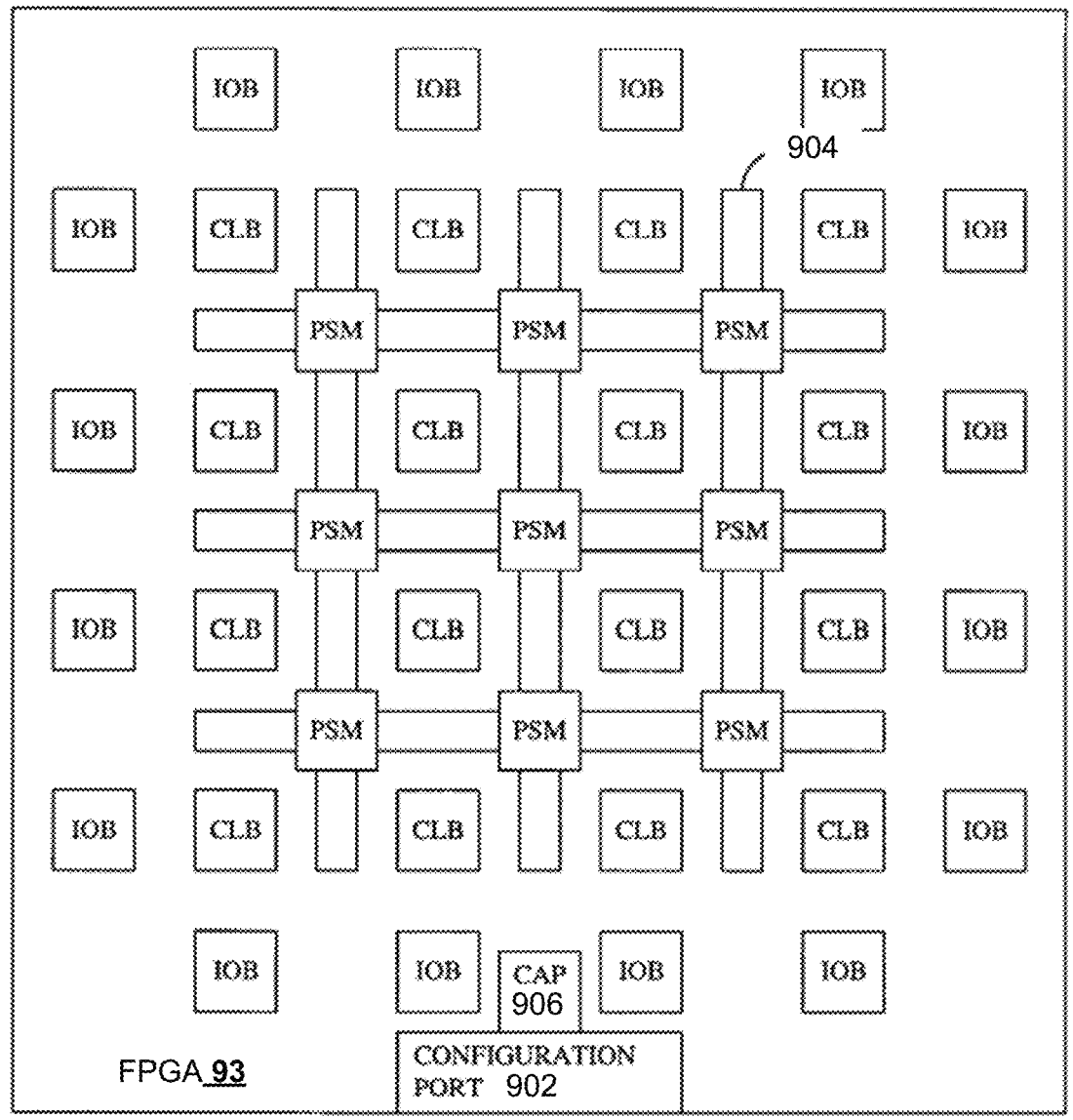
FIG. 19 shows a simplified schematic of a conventional a field programmable gate array (FPGA) for use with the system shown in FIG. 1.

The memory 820 stores information within the system 91. In some implementations, the memory 820 is a computer-readable medium. In some implementations, the memory 820 is a volatile memory unit. In some implementations, the memory 820 is a non-volatile memory unit. The storage device 830 is capable of providing mass storage for the system 91. In some implementations, the storage device 830 is a computer-readable medium. In some implementations, the storage device 830 can include, for example, a hard disk device, an optical disk device, a solid-state drive, a flash drive, magnetic tape, or some other large capacity storage device. In some implementations, the storage device 830 may be a cloud storage device, e.g., a logical storage device including multiple physical storage devices distributed over a network and accessed using a network. The input/output device 940 provides input/output operations for the system 91. In some implementations, the input/output device 940 can include one or more of a network interface devices, e.g., an Ethernet card, a serial communication device, e.g., an RS-232 port, and/or a wireless interface device, e.g., an 802.9 card, a 3G wireless modem, a 4G wireless modem, or a carrier pigeon interface. In some implementations, the input/output device can include driver devices configured to receive input data and send output data to other input/output devices, e.g., keyboard, printer, and display devices 860. In some implementations, mobile computing devices, mobile communication devices, and other devices can be used. FIG. 19 is a simplified schematic of a conventional FPGA 93. The FPGA 93 includes user logic circuits such as input/output blocks (IOBs), configurable logic blocks (CLBs), and a programmable interconnect 904, which contains programmable switch matrices (PSMs). The CLB can include logic blocks made of logic gates (e.g., NAND gates), an interconnection of multiplexors, a lookup table, and PAL style wide input gates, and other compatible logic blocks.

Each IOB and CLB can be configured through a configuration port 902 to perform a variety of functions. This configuration can be accomplished using some programming technologies compatible with reconfigurable architectures (e.g., static memory, flash, and anti-fuse based programming technologies.) A programmable interconnect 904 can be configured to provide electrical connections between the various CLBs and IOBs by configuring the PSMs and other programmable interconnection points (PIPS, not shown) through a configuration port 902. Typically, the IOBs can be configured to drive output signals or to receive input signals from various pins (not shown) of the FPGA 93.

The FPGA 93 also includes dedicated internal logic. Dedicated internal logic performs specific functions and can only be minimally configured by a user. For example, a configuration port 902 is one example of dedicated internal logic. Other examples may include dedicated clock nets (not shown), power distribution grids (not shown), and boundary scan logic (i.e. IEEE Boundary Scan Standard 1149.1, not shown).

The FPGA 93 is illustrated with 16 CLBs, 16 IOBs, and 9 PSMs for clarity only. Actual FPGAs may contain thousands of CLBs, thousands of IOBs, and thousands of PSMs. The ratio of the number of CLBs, IOBS, and PSMs can also vary.

While certain implementations have been described above, other implementations are possible. For example, while the adapter 100 is generally shown without a cover, a cover may be used to protect a connected personal device.

Figure 20A:
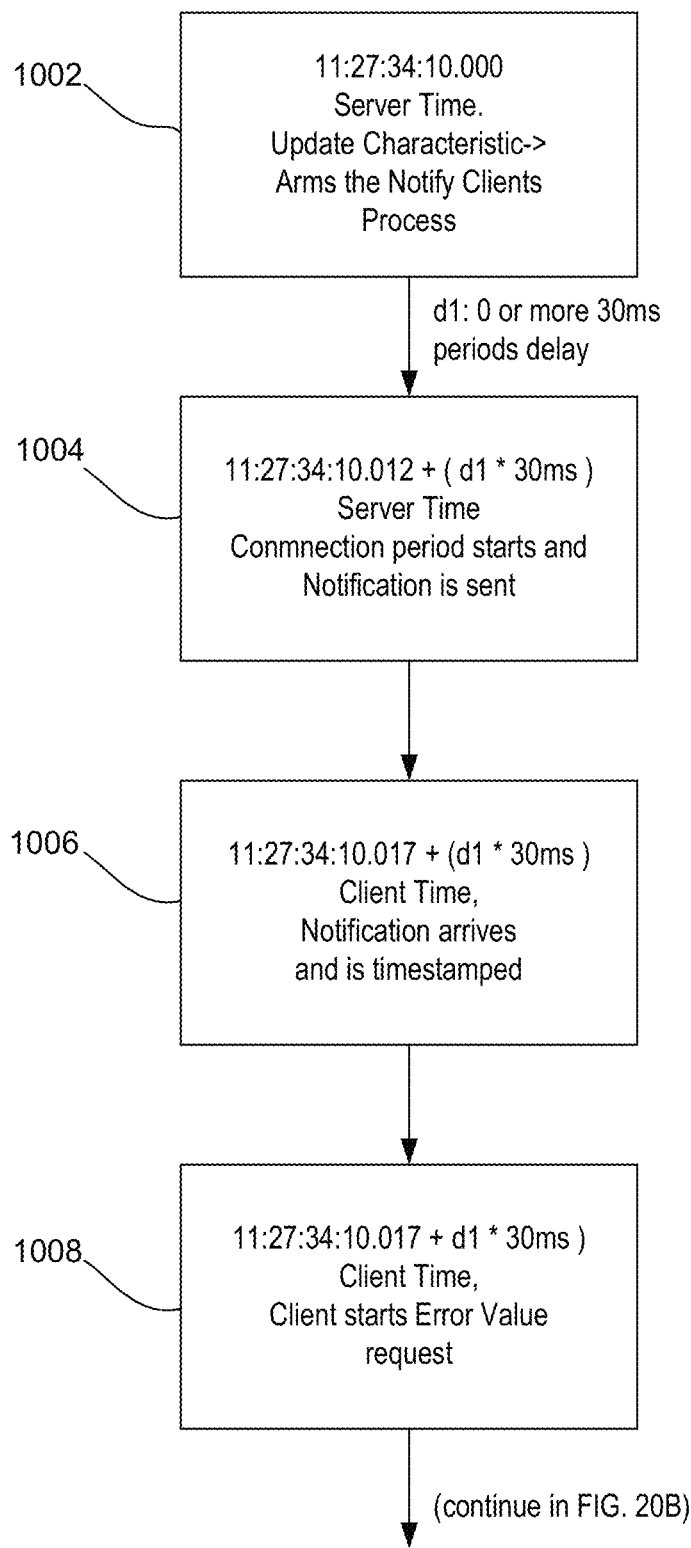
FIGS. 20A-20C show a flow chart diagramming an example timing protocol allowing for synchronization between the multiple personal consumer devices, over a BLE network, including synchronization of the media content captured by each of the personal consumer devices at an event.
Figure 20B:
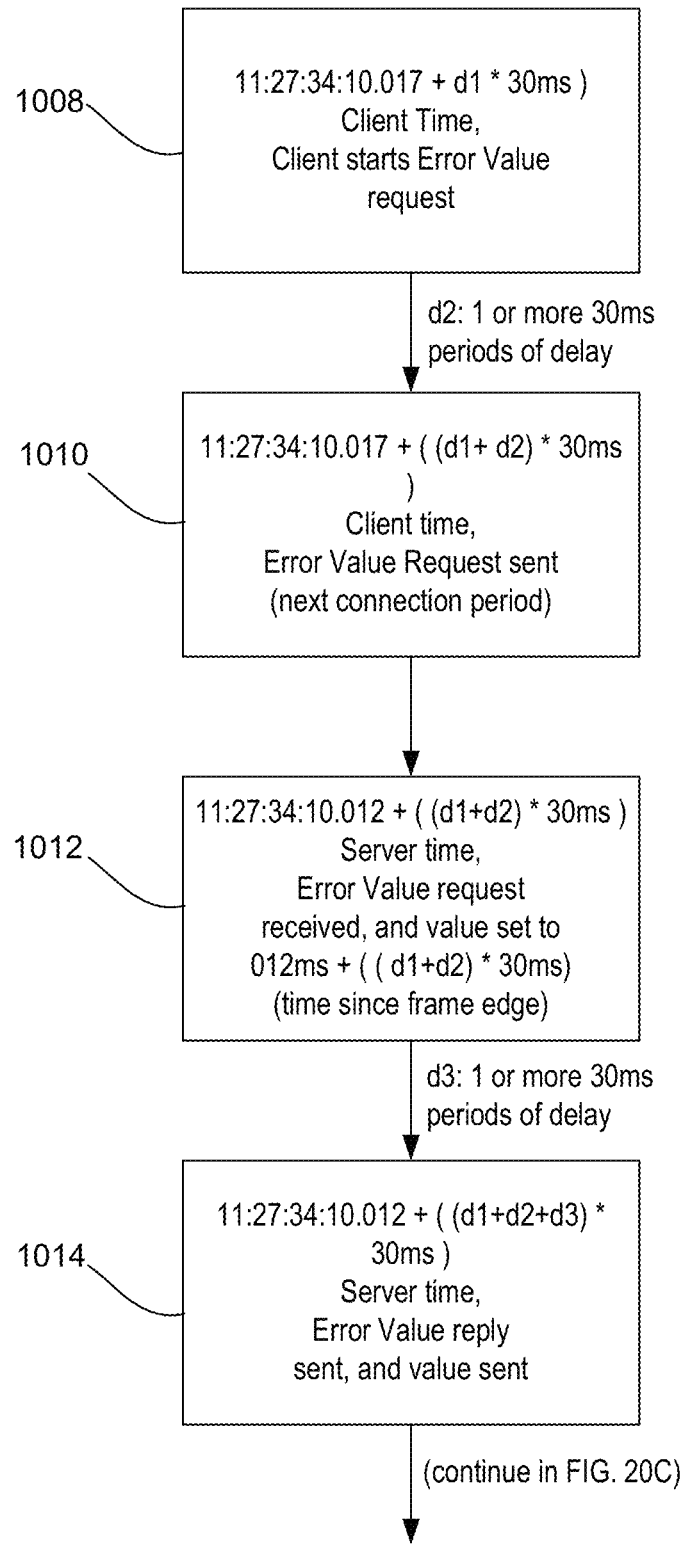
Figure 20C:
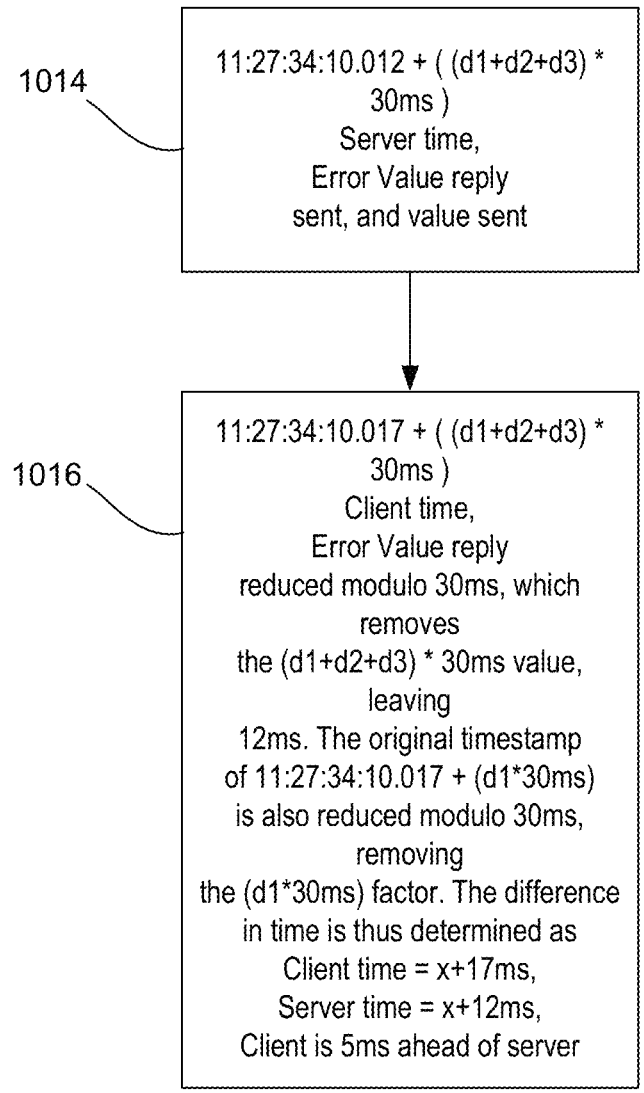

FIGS. 20A-20C show a flow chart diagramming an example timing protocol 1000 allowing for synchronization between the multiple personal consumer devices, over a BLE network, including synchronization of the media content captured by each of the personal consumer devices at an event.

As previously described, Bluetooth connectivity is becoming an increasingly common feature of audio and video devices. However, in the context of media synchronization systems, the transfer of timing data over a Bluetooth network, specifically over Bluetooth Low Energy (BLE) networks, faces challenges. In particular, BLE data packets generally occur at the boundaries of "connection periods", wherein such "connection periods" are negotiated at connection time, and thus such BLE data packets are not known by a server handling the transmission of the data packets between media devices and other timecoding devices (i.e., base stations, accessories, etc.) until a connection is made. As these "connection periods" are not related to either seconds or frames, at either end of the connection, it is necessary to allow for this within the transfer protocol.

The systems and methods of the present disclosure utilize a specialized timing protocol, between the multiple media devices, over a BLE network, for synchronization of the media content captured by each of the media devices at the event. In particular, rather than relying on any additional hardware or adapters to address the BLE communication issues, such as implementing a low-level hardware timestamping at both ends of a connection, the specialized timing protocol of the present disclosure utilizes the existing hardware of a user's media device to carry out the timecode, synchronization, and/or metadata processes, including the exchange of timecode data over a BLE network. In other words, a user does not need to include any additional hardware attachments on their personal device in order for captured audio and/or video to be synchronized and integrated with audio and/or video captured by other media devices at the same event. The timing protocol is generally provided via software integration into a personal consumer media device and is configured to adjust and predict the variable latency nature of any asynchronous packet-based protocol, such as Bluetooth or Wi-Fi. The SDK output to the consumer device is smoothed out and jitter removed, latency is predicted and adjusted for.

For example, upon establishing a connection between a timecode server (cloud-based), which may include a BLE server, and a timecode user (client device), which may include a BLE client device (e.g., personal consumer device), the timing protocol process may begin. For example, at a fixed point within a second, which may generally initiate at the start of frame 10, the timecode server updates a notifiable characteristic containing timecode data, which may encrypted or obfuscated to stop unauthorized snooping of the data. The client device will be notified of this at the start of the next possible connection period, at which point the client device then time-stamps the arrival of this message. It should be noted that, due to the nature of BLE, this event may not be the actual next connection period boundary, as there could be radio interference that delays the transmission by one or more connection periods. The client device is aware of the connection period length, as the connection period length is made available when the connection is formed, and does not normally change within the life of a connection. The client device requests the error value characteristic from the timecode server. The error value characteristic request normally takes place at the start of the next connection period, again possibly delayed by a whole number of connection periods. The arrival of this request is processed immediately on receipt by the timecode server, which then converts the precise time into the seconds, starting at the fixed point in the second selected at the initial step, and sends the precise time to the client device. It should be noted that the precise time may not arrive back at the client device for a whole number of connection periods. The precision of this error value is generally appreciably better than 1 ms.

The client device then takes the operating system's timestamp at the time of receiving the error value. In one instance, in the event that the round loop time has taken less time than 2.5 connection periods, then it is assumed that the transit time from the client device to the timecode server has taken only one connection period, and the reply has also taken only one connection period. The time-stamp provided in the error message is then considered valid one connection period earlier than the time that the error message arrived at the client device. The error value is appended to the timecode message, to provide a corrected time.

In an alternative instance, in the event that the error message takes less than or more than two connection periods, the error message value, which has been reduced modulo of the connection period, to the original time-stamp of the timecode message. It should be noted that the error message value is not added to the time-stamp at which the error message was requested. In this alternative step, it should be noted that the timing protocol process is not dependent on how many connection periods have elapsed between the original timecode message and the receipt of the error message by the client device, as it is only the offset into the connection period that is of importance.

In either instance, the resultant corrected timecode is converted into an absolute time, where the absolute time may be compared with the operating system time to detect both an absolute offset variable and a frequency offset variable. The absolute offset and frequency offset variables are then used to calculate where the subsequent frame edges are on request from the client device's application. There are specific corner cases which have not been covered, such as how to detect when the incoming time has changed so considerably that a large jump in client timecode is necessary, when the timecode freezes, (as in the Rec-Run) methodology, and when the timecode server has stepped to a new value as a result of setting a new timecode at the source. Such specific cases may be managed separately, by utilizing other flags and variables embedded in the timecode messages.

Referring to FIGS. 20A-20C, a flow chart is shown diagramming an example timing protocol 1000 allowing for synchronization between the multiple personal consumer devices, over a BLE network, including synchronization of the media content captured by each of the personal consumer devices at an event. In this example, a timecode is represented as Hours:Minutes:Seconds:Frames.milliseconds and a connection period is assumed to be 30 ms, which is common for a specific operating system (i.e., iOS systems for the iPhone and iPad). However, it should be noted that the timing protocol is compatible with other operating systems. It should be further noted that, in ideal operations, $d1=0$, $d2=1$, and $d3=1$. Thus, steps 1004, 1006, and 1008 occur at 11:27:34:10.012 server time, step 1012 occurs at 11:27:34:10.042 server time, and step 1014 occurs at 11:27:34:10.072 server time, as will be described in greater detail herein.

At an initial step (1002), timecode 11:27:34:10.000 occurs at the server. In particular, the server updates the timecode characteristic. Note that at that time, the server does not need to know where the connection period boundary is relative to the timecode. At subsequent steps (1004, 1006, and 1008), at time 11:27:34:10.012, a connection period starts, and the characteristic is passed to the client device. The characteristic arrives at 11:27:34:10.017 according to the client device and is timestamped as such. At step 1010, at time 11:27:34:10.047, the client device requests an error value characteristic. At step 1012, the server replies with its current time since 11:27:34:10.000, which is 42 ms. At step 1014, at time 11:27:34:10.077 client device time, the client device receives the message. At step 1016, the client device reduces this modulo 30 (the connection period), and returns 12 ms. This is added to the original timecode, allowing the client device to deduce that at 11:27:34:10.017 client device time, the server thought it was 11:27:34:

10.012. This determination allows the client device to know that it should alter its internal concept of timecode by 5 ms to match the server.

It should be noted that, in the initial step 1002, as the timecode server does not need to know the boundary of the connection period, the server can run as an application, without any particular need for hardware level access. As such, the server can simply be application level software. Although there are un-corrected delays between the actual BLE messages and the arrival of these messages at the application, these can be assumed to be approximately symmetrical between upstream and downstream messages, and also approximately consistent with time, on a given platform. It is thus feasible to measure and correct for these delays during development for any given platform, to remove this otherwise constant offset of a few milliseconds.

In the example protocol 1000 of FIGS. 20A-20C, the OS delay before the timecode message arrives in steps 1004, 1006, and 1008, will introduce an error. However, approximately the same delay will be added to the arrival of the error value message in step 1014. The difference is thus still correct. The client device would then be running late by the given delay. However, the delay in processing the error value request in step 1012 will approximate to the same value, and as this delays the timestamping in the server, it will return a value which is in error by that delay. This will essentially cancel the first error, if both upstream and downstream delays are approximately equal. The resulting errors generally consist of a Gaussian distribution of variability in the OS processing time, such that the errors are averaged out.

Accordingly, the timing protocol of the present disclosure provides a software solution for at least personal consumer media devices. In particular, the timing protocol allows for the syncing of smartphones and other BLE-equipped devices together, using existing their hardware and their existing wireless technology, such as BLE and Wi-Fi connectivity. The software SDK and APIs for a given personal consumer media device allow the devices to be set in master and slave relationships, timecode encode and decode, metadata exchange for additional sync information that can be utilized during the multi-camera sync process by edit software. The timing protocol allows for acquisition of sync signals and clock edges relating to timecode frames within the packet structure, which allows all slave devices to either be pulled faster or slower to match the master, thereby making sure that all connected devices remain in sync and all have the same drift/sensor sync frames per second (fps). The timing protocol may allow for a "closed-loop" of wireless short-range sync and metadata exchange to ensure all device clocks are "pseudo" synced together, whether this includes a camera sensor for video or the sample rate adjustment needed for recording separate audio.

The timing protocol of the present disclosure further allows for an API of the timecoding systems described previously herein to further sync timecode/timing SDK to either device GPS clock, cellular network clock, 3G/4G and 5G networks, and/or NTP (network time protocol) servers. The systems and methods of the present disclosure may further include a software SDK library configured to translate "real time/wall clock" sources into SMPTE timecode and SMPTE frame rates to allow easy and simple multi-camera edits by consumer edit platforms.

While methods previously described herein may implement what is, in effect, a PID (Proportional, Integral, Derivative) error correction methodology in the client devices, so as to maintain a current knowledge of the absolute timing error (the proportional factor) and the frequency error (the integral factor) between the Client and the Server, there are limitations in this methodology when applied in its simplest form. For example, if the client device modifies its internal clock to track the incoming error values, then it loses knowledge of the absolute frequency error in the relationship, as the frequency of the client device must be intentionally altered to an incorrect value in order to allow for the correction of the timing error. Essentially, the integral factor can only be correct when the proportional factor has already stabilized to a constant value, and due to jitter in the timing of the error messages, this may not happen. This limitation has no effect while communication between the client device and server is maintained, but it can lead to increasing errors in the event that communications break down between client devices and the server.

The present disclosure further provides error correction methodologies to address potential issues that may arise in the event that communication between a client device and a server break down or is interrupted.

In one embodiment, a next generation (NG) algorithm may be used to separate the process of identifying the client server errors from the process of correcting those errors. In this embodiment, the client device never alters its own internal clock, thus ensuring that it has an unwavering reference to time-stamp the incoming messages against. The incoming messages contain an absolute and ever increasing time, which is not cyclic, (as timecode is, looping around every 24 hours) and represents the "system time". These messages are sent at the times that they represent, from the viewpoint of the server, and are time-stamped on arrival at the client device. Each pair of times (sent time/received time) can be visualized as an XY point of a graph. These are collated in to groups, (nominally of 256 pairs) and the center point of each group is calculated. By generating a slope through the center points of multiple groups, it is possible to calculate the ratio of the two clocks in the server and client device. This is possible to single parts per billion, and is limited only by the jitter in the radio transmissions and the drift of the two clocks with time.

The generated equation is in the form y=ax+b, where a is the frequency ratio and b is the time offset (i.e., ClientTime=FrequencyError*ServerTime+TimeError). With this equation in place, it is simple to extrapolate the expected position of the Server at any time, even if communications is lost.

A simple error tracking algorithm, essentially a Proportional Error correction process, follows this extrapolation, to keep the hardware clock in sync with the virtual model. Because the Proportional Error correction algorithm drives a purely digital "Numerically Controlled Oscillator", it is possible to predict its value at that point in the future as well. The tracking algorithm utilizes a set of limits to ensure that the absolute frequency cannot deviate beyond expectation, and the rate of change of frequency cannot deviate beyond expectation. This allows it to implement an S-curve algorithm which will accelerate to the fastest allowed correction in the event of a perceived error. It will then decelerate to meet the correct ax+b line generated by the virtual Server model having corrected a and b simultaneously.

The algorithm calculates a point in the near future at which it wants to make a correction. It can then check the Virtual Server model to see where it will be, and a virtual model of the NCO to see where it will be. It can then apply a correction to move both the absolute position of the NCO model's line on the graph to cross the Virtual Server's line on the graph at a point in the future beyond that, but also to force the slope of the two lines to match when they do cross. At that point in the future, which is a purely digital model, the two clocks will coincide to the best that the models can agree. This is completely predictable, as it is mathematical, and not hardware limited. A simple PID type algorithm corrects the rounding errors that may arise between the hardware NCO and the software model of it.

As these methods do not suffer from the problems inherent in PIDs, such as either overshoot or slow settling time, it is possible, utilizing this method, to achieve closer frequency corrections and closer absolute error values, within a far shorter capture period.

In a second embodiment, involves isolating the concept of synchronization from that of timecode as such. By converting all incoming timing data at the server, (or generating it internally if the server is the timing source) and then converting it to a generic ax+b equation relative to system time, it is possible to transfer a and b to the client device in a simple un-time-stamped packet, at relatively infrequent periods, which can be reconstructed into timecode at the destination.

As the generated data within the client device is purely a slope relative to the system time, and it is not cyclic, but has a time at which it passes the origin of the XY graph, it is possible to reconstruct any timecode, regardless of frame rate, and independent of the fractional/non-fractional frame rates that are inherent in other methods. There is thus the concept of an 'era' at which timecode was absolutely zero. This can be referenced to a real time and date, allowing otherwise completely isolated timecode generators to generate synchronous timecode from any precision time source, such as GPS time, PTP, etc. By isolating the concept of actual frames from the transferred data, it is also possible to generate correctly synchronized but different frame rates, and it is also possible to synchronize fractional frame rates to a synchronizing source such as GPS, which has no concept of timecode as such, only real time.

If the two concepts above are implemented, then given that timecode is simply a referenced a and b value relative to the already synchronized system time, it is possible for a single network of synchronized devices to transfer multiple, unrelated timecode streams. This allows multiple users, with non-synchronized timecode generators, to maintain individual clocks at specific Clients, without having to worry about the overhead of multiple streams of synchronization packets which may pass in and out of synchronization with each other.

The systems and methods of the present disclosure further provide for the expansion of communication and synchronization of media devices across a greater distance than what is generally provided over a Bluetooth network, particularly a BLE network. In particular, the present disclosure provides an accessory device configured to communicate over at least a Bluetooth network and is further configured to communicate over a radiofrequency (RF) network. For example, upon pairing with one or more personal media devices over a Bluetooth network, the accessory device is configured to establish a master/slave setup and device association, in which the accessory device can serve as the master and one or more personal media devices serve as the slave(s), in which timecode data may be transmitted wirelessly from the accessory device directly into a media file of a connected personal media device. In particular, the accessory device comprises a highly accurate temperature compensated crystal oscillator ("TCXO") and timecode generator used as the "master" generator and clocking source. The accessory device master timing signal is accurate and stable, thereby allowing (by way of the specialized timing protocol provided in a BLE SKD) effective communication with the one or more personal media devices. In particular, the accessory device is configured to govern and "pseudo" genlock sync camera module frame rate delivery, allowing all paired personal media devices to capture media content at exactly the same frame rate without any drift over time.

The accessory device is configured to pair and communicate with a plurality of personal media devices, so long as the personal media devices are within the standard range for Bluetooth connectivity. Accordingly, at an event that covers a large distance (i.e., a live concert or sporting event), multiple accessory devices may be provided, wherein each accessory device is paired with a respective set of a plurality of personal media devices. The multiple accessory devices can be spaced distances apart, while still configured sync with one another and exchange metadata on a network dedicated to the accessory devices.

Furthermore, because the accessory device is configured to communicate over an RF network, the accessory device is configured to bridge a long range RF network ((e.g., a BLINK network) (covering hundreds of meters) together with the shorter range Bluetooth network (specifically the BLE network). Accordingly, the accessory device expands the synchronization of personal media devices with professional media devices that normally operate over the RF network, allowing such devices to communicate captured media content across a greater distance. In particular, professional media devices are able to share the same sync network and join the network with other hardware products that can give physical timecode and genlock signals derived from the network (i.e., allowing for the supply of highly accurate timecode, genlock, and wordclock data into professional devices with the same frame rate and timecode as the personal media devices.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, firmware, software application, script, executable logic, or code) can be written in any form of programming language, including compiled or interpreted languages, or declarative or procedural languages, and it can be deployed in any form, including as a standalone program or as a module, component, subroutine, or another unit suitable for use in a computing environment or implementation in a Field Programmable Gate Array (FPGA) or compiled firmware embedded in an Application Specific Integrated Circuit (ASIC). A computer program does not easily correspond to a file in a file system. A program can be stored in a portion of a. file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Computer readable media suitable for storing computer program instructions and data include all forms of nonvolatile or volatile memory, media and memory devices, including by way of example semiconductor memory devices, e.g., EPROM, EEPROM, and flash memory devices; magnetic disks, e.g., internal hard disks or removable disks or magnetic tapes; magneto-optical disks; CD-ROM and DVD-ROM disks; or any other type of non-transitory storage medium suitable for storing electronic instructions, and each coupled to a computer system bus. The processor and the memory can be supplemented by, or incorporated in, special purpose logic circuitry. The components of the system can be interconnected by any form or medium of digital data communication, e.g., a communication network. Examples of communication networks include a LAN and a WAN.

Processor refers to any device or system of devices that performs processing operations. A processor will generally include a chip, such as a single core or multi-core chip, to provide a central processing unit (CPU). A processor may be provided by a chip from Intel or AMD. A processor may be any suitable processor such as the microprocessor sold under the trademark XEON E7 by Intel (Santa Clara, Calif.) or the microprocessor sold under the trademark OPTERON 6200 by AMD (Sunnyvale, Calif.).

The embodiments described and shown herein are exemplary. Other implementations are within the scope of the following claims. For instance, various combinations and changes are possible and are considered to be part of this disclosure.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A system for synchronizing media of a same event from multiple devices, the system comprising:
    a server configured to communicate and exchange data with a plurality of media devices over a wireless personal area network, the server configured to synchronize media acquired by each of the plurality of media devices at an event; and
    at least a first media device of the plurality of media devices configured to capture media at the event, wherein the first media device comprises a hardware processor coupled to non-transitory, computer-readable memory containing instructions executable by the processor to cause the first media device to:
        establish a wireless connection with the server;

receive a first set of timecode data from the server, the first set of timecode data comprising a value of time corresponding to a start time of a first connection period with the server, wherein the start time is based on a reading of an internal clock of the server;

timestamp the first set of timecode data upon receipt thereof, wherein the timestamped first set of timecode data is based on a reading of an internal clock of the first media device;

transmit, upon conclusion of the first connection period, a request to the server for an error value characteristic;

receive a second set of timecode data from the server in response to the request, the second set of timecode data comprising a value of time corresponding to a reading of the internal clock of the server upon receipt of the request;

determine the error value characteristic based, at least in part, on a comparison of the first and second sets of timecode data and an elapsed period of time of the first connection period; and prior to transmitting timecode data associated with the acquired media at the event, adjust value of the timecode data based, at least in part, on the determined error value characteristic to thereby ensure the first media device time matches the server time, wherein the server is configured to provide at least some of the acquired media data to a social media platform to allow users of the platform to merge at least some of the media data acquired by at least the first media device.

2. The system of claim 1, the non-transitory, computer-readable memory containing instructions executable by the processor to cause the first media device to:

transmit, upon conclusion of each subsequent connection period following the first connection period, requests to the server for additional error value characteristics; and determine the additional error value characteristics.

3. The system of claim 2, the non-transitory, computer-readable memory containing instructions executable by the processor to cause the first media device to:

adjust value of timecode data based, at least in part, on the determined error value characteristics to thereby ensure the first media device time matches the server time, prior to transmitting timecode data associated with acquired media at the event.

4. The system of claim 1, wherein the acquired media comprises at least one of image data and audio data.

5. The system of claim 4, wherein the first media device comprises at least one of a camera and microphone for acquiring image data and audio data.

6. The system of claim 1, further comprising at least a second media device comprising a hardware processor coupled to non-transitory, computer-readable memory containing instructions executable by the processor to cause the second media device to:

establish a wireless connection with the server;

receive a third set of timecode data from the server, the third set of timecode data comprising a value of time corresponding to a start time of a second connection period with the server, wherein the start time is based on a reading of an internal clock of the server;

timestamp the third set of timecode data upon receipt thereof, wherein the timestamped third set of timecode data is based on a reading of an internal clock of the second media device;

transmit, at conclusion of the second connection period, a request to the server for an error value characteristic;

receive a fourth set of timecode data from the server in response to the request, the fourth set of timecode data comprising a value of time corresponding to a reading of the internal clock of the server upon receipt of the request;

determine the error value characteristic based, at least in part, on a comparison of the third and fourth sets of timecode data and an elapsed period of time of the second connection period; and prior to transmitting timecode data associated with acquired media at the event, adjust value of the timecode data based on the determined error value characteristic to thereby ensure the second media device time matches the server time.

7. The system of claim 6, wherein the server is configured associate the adjusted timecode data received each of the first and second media devices with media data of the same event acquired by the synchronized first and second media devices by embedding adjusted timecode data into the acquired media data.

8. The system of claim 1, wherein the plurality of media devices comprises any one of a mobile phone, a tablet, or a laptop.

9. The system of claim 1, wherein the at least first media device is a mobile phone.

10. The system of claim 9, wherein the mobile phone is a smartphone.

11. The system of claim 1, further comprising a database for storing the associated timecode data and the acquired media data.

12. The system of claim 1, wherein the wireless personal area network comprises at least one of a Bluetooth network, Wi-Fi network, and Near Field Communication (NFC) network.

13. The system of claim 12, wherein the Bluetooth network comprises a Bluetooth Low Energy (BLE) network.

14. The system of claim 1, further comprising an accessory computing device configured to communicate and exchange data with the plurality of media devices via the server.

15. The system of claim 14, wherein the accessory computing device comprises a first communication module configured to communicate over at least one of a Bluetooth network, Wi-Fi network, and Near Field Communication (NFC) network.

16. The system of claim 15, wherein the accessory computing device comprises a second communication module configured to communicate over a radiofrequency (RF) network.

17. The system of claim 16, wherein the accessory computing device is configured to communicate and exchange data with a second set of a plurality of media devices over the RF network.

18. The system of claim 17, wherein the accessory computing device is configured to bridge the wireless personal area network with the RF network.

19. The system of claim 18, wherein the plurality of media devices comprises personal media devices and the second set of plurality of media devices comprises professional media devices.

* * * * *